(12) United States Patent  
Hayashi et al.

(10) Patent No.: US 7,971,741 B2  
(45) Date of Patent: Jul. 5, 2011

(54) FOLDING BOX MADE OF SYNTHETIC RESIN

(75) Inventors: Yuuichirou Hayashi, Gifu (JP); Tetsuya Murakami, Gifu (JP)

(73) Assignee: Gifu Plastic Industry Co., Ltd., Gifu (JP)

(*) Notice: Subject to any disclaimer, the term of this patent is extended or adjusted under 35 U.S.C. 154(b) by 770 days.

(21) Appl. No.: 11/993,857

(22) PCT Filed: Nov. 7, 2005

(86) PCT No.: PCT/JP2005/020371  
§ 371 (c)(1),  
(2), (4) Date: Dec. 21, 2007

(87) PCT Pub. No.: WO2007/004315  
PCT Pub. Date: Jan. 11, 2007

(65) Prior Publication Data  
US 2010/0127060 A1    May 27, 2010

(30) Foreign Application Priority Data  
Jul. 1, 2005  (JP) .................................. 2005-194153

(51) Int. Cl.  
*B65D 6/18*  (2006.01)  
(52) U.S. Cl. ............................................. 220/6; 220/62  
(58) Field of Classification Search ............... 220/6, 62, 220/62.1, 7, 646, 648, 649, 650; 229/198.1  
See application file for complete search history.

(56) References Cited

U.S. PATENT DOCUMENTS

| 1,160,760 | A | * | 11/1915 | Rexford | ........................ 229/102 |
| 1,833,469 | A | * | 11/1931 | Myers | .............................. 217/57 |
| 4,896,787 | A |   | 1/1990 | Delamour et al. | |

(Continued)

FOREIGN PATENT DOCUMENTS

DE    42 35 061 A1    4/1994

(Continued)

OTHER PUBLICATIONS

Supplementary European Search Report for the Application No, EP 05 80 0388 dated Jul. 6, 2009.

(Continued)

*Primary Examiner* — Stephen Castellano  
(74) *Attorney, Agent, or Firm* — Cheng Law Group, PLLC

(57) ABSTRACT

A folding box made of synthetic resin which a worker can surely grip and stably carry without a slip by gripping whichever edge parts of a hexahedron of a box with both hands is provided. The folding box includes a rectangular-tube shaped side wall configuration member 3 comprised of four side panels 1 made of hard synthetic resin, adjacent side ends of the four side panels 1 being foldably connected to each other through side panel connecting hinge parts 2, a bottom plate configuration member 6 comprised of connecting bottom pieces 4 made of hard synthetic resin which are foldably connected to bottom ends of the plurality of side panels 1 through bottom piece connecting hinge parts 5, and a lid configuration member 7 comprised of lid pieces 15 made of hard synthetic resin which are foldably connected to upper ends of the plurality of side panels 1 through lid piece connecting hinge parts 10. Nonslip parts 13 made of soft synthetic resin exposed to the outside are provided near edges of one or both surfaces adjacent to each other at right angle through edges of a hexahedron. The Nonslip parts are provided near all the sides of the hexahedron.

7 Claims, 18 Drawing Sheets

U.S. PATENT DOCUMENTS

| | | | |
|---|---|---|---|
| 5,452,817 A * | 9/1995 | Taravella et al. | 220/4.33 |
| 6,416,701 B1 | 7/2002 | Molander | |

FOREIGN PATENT DOCUMENTS

| | | |
|---|---|---|
| EP | 0 306 381 A1 | 3/1989 |
| GB | 1 540 679 | 2/1979 |
| JP | 51-062940 U | 5/1976 |
| JP | 53-1767 U | 10/1978 |
| JP | 55-115521 U | 8/1980 |
| JP | 62-105127 U | 7/1987 |
| JP | 07-158249 A | 6/1995 |
| JP | 08-169436 A | 7/1996 |
| JP | 08-282648 A | 10/1996 |
| JP | 2003-011952 A | 1/2003 |
| JP | 3547763 B2 | 4/2004 |

OTHER PUBLICATIONS

International Search Report for PCT/JP2005/020371 mailed Dec. 13, 2005.

Notification of Reasons for Refusal for Application No. 2005-276520 from Japan Patent Office dated Feb. 8, 2011.

* cited by examiner

FOLDING BOX MADE OF SYNTHETIC RESIN

TECHNICAL FIELD

The present invention relates to a folding box made of synthetic resin.

BACKGROUND ART

In the past, there is known, in Japanese Patent Application Laid-Open No. 8-169436 (Patent Document 1), a folding box made of cardboard which becomes a rectangular or square shape in a plan view in a state where the folding box is assembled into a box form by foldably connecting adjacent side ends of four front/rear/left/right side surfaces and is configured to be able to be folded flatly by being folded into an approximate parallelogram form in such a way that each corner of one pair of diagonal corners become an acute angle and each corner of the other pair of diagonal corners become an obtuse angle. The folding box of the above-mentioned form can be folded compact because the folding box is folded so that inner surfaces of the respective side surfaces on the front, rear, left and right overlap each other in a folded state and can be stored in a small space in an unused state. In folding the folding box, the folding box can be easily folded by being folded into an approximate parallelogram form in such a way that each corner of one pair of diagonal corners become an acute angle and each corner of the other pair of diagonal corners become an obtuse angle as described above. In forming the folding box into a box form, the folding box can be formed into a box form simply by being folded in such a way that the opposed corners become a right angle, in a reverse procedure to above. That is, this folding box has a characteristic that folding and assembly are easy.

However, the folding box made of cardboard is low in strength and easy to be broken. Further, the folding box made of cardboard tends to be soiled and, once soiled, the soil is hardly removed and cannot be cleaned. Because of these reasons, in a normal form of use, the folding box made of cardboard is disposed when the folding box is used only once. This is not preferable from a viewpoint of resource saving. Even if the folding box made of cardboard is reused, the folding box made of cardboard can be reused only three to five times since the folding box is low in strength, tends to be soiled, and, once soiled, the soil is hardly removed and cannot be cleaned as described above. A worker usually carries the folding box made of cardboard in such a manner as to grip a pair of opposed sides of a lower surface with both hands to hold the entire folding box. However, since an outer surface of the folding box made of cardboard is made slippery, there is a problem that the folding box is slippery and hard to be carried. When the worker carries the folding box made of cardboard in a manner other than the manner described above, for example, when the worker carries the folding box in such a manner that the worker grips one side portion of the lower surface with one hand and grips one side portion of an upper surface on a diagonal line of the box with the other hand, since a posture of the box made of cardboard is unstable, the box is more slippery and hard to be carried. In some cases, the worker carries the folding box made of cardboard in such various postures as to grip the folding box upside down or with the front and rear or the left and right reversed with both the hands or gripping corners of a hexahedron with both the hands. In all the cases, the folding box made of cardboard is still slippery and hard to be carried. Moreover, when the folding box made of cardboard is tied with a string, there is a problem that the string is slippery and a position of the string moves or the folding box cannot be firmly tied. In this case, to make the string less slippery, the folding box made of cardboard only has to be tied stronger than necessary to cause the string to cut into the folding box made of cardboard. However, in this case, there is a problem that the folding box made of cardboard is damaged. Moreover, when not in use, a plurality of folding boxes made of cardboard are stored or transported in a state where each folding box is folded flatly and laid and stacked vertically. However, since the folding box made of cardboard is folded in a state where the center portion thereof is higher than outer ends thereof, a folded shape thereof is unstable. Therefore, when the folding boxes made of cardboard is placed in a state where the folding box tilts to one side end side with respect to the center in the vertically stacked state, the placement is unstable. Moreover, since the folding box is made of cardboard, the folding box is slippery. Because of these reasons, there is a problem that, when the folding boxes made of cardboard are stacked in a large number of stages in a state where the folding boxes are folded flatly, the folding boxes tend to collapse. Furthermore, when the folding boxes made of cardboard are vertically stacked in multiple stages and stored or transported in a state where the folding boxes are assembled into a box form and have contents therein, the folding box at an upper stage tends to slip with respect to the folding box at a lower stage and the folding boxes may collapse.

A folding box made of synthetic resin is proposed by Japanese Patent Application Laid-Open No. 8-282648 (Patent Document 2) as a folding box which can be folded and assembled into a box form in the same manner as the folding box made of cardboard and is compatible with the folding box made of cardboard. The folding box made of synthetic resin described in Patent Document 2 including hinge parts is entirely formed of hard synthetic resin, and the hinge parts are formed as thin parts of the hard synthetic resin.

The folding box made of synthetic resin described in Patent Document 2 has a characteristic that, while the folding box can be used in the same manner as the folding box made of cardboard in the past, the folding box made of synthetic resin is high in strength, dirt of the folding box is easily removed, and the folding box can be cleaned and reused many times compared with the folding box made of cardboard. However, the worker usually carries this folding box made of synthetic resin by gripping an opposed pair of edges at bottom ends with both the hands to hold the entire folding box in the same manner as the folding box made of cardboard. Since the portions to be gripped by the hands are made of the hard synthetic resin, there is a problem that the folding box is more slippery and harder to be carried than the folding box made of cardboard. When the folding box made of synthetic resin is carried in a manner other than the manner described above, since a posture of the folding box is unstable, the folding box is more slippery. Further, the worker carries this folding box made of synthetic resin in such various postures as to, in the same manner as the folding box made of cardboard, grip the folding box upside down or with the front and rear or the left and right reversed with both the hands or gripping corners of a hexahedron with both the hands. In all the cases, the folding box made of synthetic resin is slippery and hard to be carried, as described above. Moreover, when the folding box made of synthetic resin is tied with a string, because the folding box is made of synthetic resin, there is a problem that the string is more slippery and the position thereof shifts or the folding box cannot be firmly tied. Moreover, since the folding box made of synthetic resin is folded to be flat in the same manner as the folding box made of cardboard, a folded shape is unstable. Therefore, in transporting or storing the folding box made of synthetic resin, when a plurality of folding boxes made of synthetic resin are vertically stacked and stored or transported in a state where the folding boxes are folded flatly and laid to be flat in the same manner as the folding box made of cardboard, the folding boxes cannot be stably stacked. In particular, since the folding boxes in upper and lower stages are vertically stacked while side panels formed of hard synthetic resin are in contact with each other, the folding boxes are more slippery than the case of the cardboard. When the folding boxes of a synthetic resin are stacked in a large number of stages, there is a problem that the folding boxes more easily collapse. The folding boxes made of synthetic resin are also vertically stacked in multiple stages and stored or transported in a state where the folding boxes are assembled into a box form and have contents inside them. Since the folding box made of synthetic resin is more slippery than the folding box made of cardboard as described above, the folding box at an upper stage tends to slip with respect to the folding box in a lower stage and the folding boxes may collapse.

Furthermore, the folding box made of synthetic resin in the past described in Patent Document 2 is one component entirely molded by integral molding of synthetic resins. Thus, in the case of a large folding box, a size of a die increases, which causes an increase in cost.

There is also known, in Japanese Patent No. 3547763 (Patent Document 3), an assembled box made of synthetic resin formed by continuously connecting panels to be side surfaces to four sides of one panel to be a bottom through hinge elements, respectively, and continuously connecting a panel to be a lid surface to the panel to be the side surface through a hinge element.

This assembled box of Patent Document 3 is formed by integrally molding a plurality of hinge elements as a net with a first injection molding die using a first plastic material, molding the respective surfaces of the box by injecting a second plastic material into a second injection molding die in a state where this net is arranged in the second injection molding die, and insert-molding both sides of respective pieces of the net in the inside of ends of the panels to be the respective surfaces of the box made of the second plastic material. In this assembled box, projection tips of convex projecting parts provided in the net slightly project in a dot shape to outer surfaces of the ends of the panels to be the respective surfaces of the box made of the second plastic material, whereby additional friction is generated to prevent boxes from sliding with respect to each other.

However, in this assembled box described Patent Document 3, although nonslip parts are provided on the outer surfaces of the panels forming the surfaces of the hexahedral box, only the tips of the convex projecting parts projecting and exposed in the dot shape from the net buried in thickness of the ends of the panels function as the nonslip parts. Thus, an exposed area of the nonslip parts is extremely small and there is a problem that a nonslip effect cannot be sufficiently exercised. In particular, when a worker grips the hexahedral box with hands and carries the box, positions to be held varies from worker to worker and, moreover, positions where the hands and fingers touch vary depending on sizes and lengths of the hands and the fingers of the worker, a bending state of the hands and the fingers in gripping the box, and the like. Therefore, it cannot be said that the hands and the fingers surely grip the nonslip parts of the dot shape. Even if the hands and the fingers successfully touch the nonslip parts of the dot shape, since the nonslip parts are only formed in the dot shape, a sufficient nonslip effect can not be obtained in gripping the box with the hands because only slight friction acts on the parts of the hands and the fingers.

Here, in Patent Document 3, it is also conceivable to increase the area of the convex projecting parts and to increase the area of the exposed parts of the tips of the convex projecting parts exposed to the outer surfaces of the panels to come into contact with the hands and the fingers in a large area and improve the nonslip effect with friction. However, in the assembled box of Patent Document 3, both the sides of the respective pieces of the net are insert-molded in the inside of the ends of the panels to be the respective surfaces of the box made of the second plastic material. Thus, there is a problem that, when the area of the convex projecting parts is increased, the convex projecting parts hinder a flow of the second plastic material when the second plastic material is injected, the second plastic material hardly flows around to an opposite side of injection points of the convex projecting parts, the second plastic material cannot be sufficiently filled in this part, and the parts cannot be accurately insert-molded. Consequently, it is impossible to increase the area of the convex projecting part to increase the area of the nonslip parts of the tips of the projections. Therefore, the sufficient nonslip effect in gripping the box with the hands as described above is not obtained.

Furthermore, in the assembled box of Patent Document 3, the plurality of panels connected through the net are expanded to continue in a plane shape in a state where the box is disassembled when the box is not in use, and the box can not be folded to be small. Therefore, there is a problem that a plane area in storing or transporting the box in the state where the box is disassembled in the plane shape is large and a large space is necessary. Moreover, there is also a problem that it takes time to assemble and disassemble the box. Furthermore, as described above, since the box is disassembled in a plane shape when the box is not in use, there is a problem that the respective inner surfaces of the panels are exposed to the outside and the inner surfaces of the panels are soiled. Therefore, there is a problem that, in reusing the box, since the inner surfaces of the box are dirty, contents in the box may be soiled.

Furthermore, in Patent Document 3, the assembled box is obtained by insert-molding the net, which is obtained by integrally molding the plurality of hinge elements, when the surfaces of the box are molded in a separate injection molding die. Thus, there is a problem in that two types of injection molding dies, i.e., a first injection molding die for molding the net and a second injection molding die for insert-molding the net are necessary as injection molding dies, it is difficult to position and hold the net in a predetermined position in the second injection molding die, the molding takes time, and molding cost increases.

DISCLOSURE OF THE INVENTION

In view of the above problem, the object of the present invention is to provide a folding box made of synthetic resin compatible with a folding box made of cardboard, wherein nonslip parts made of soft synthetic resin having a relatively large area which can surely prevent slip of hands and fingers can be formed with a simple structure in every neighborhood of the side of a hexahedron, a worker can surely grip and stably carry the folding box without a slip whichever side parts of the hexahedron of the box are gripped by the hands, the folding box can be surely tied with a string to prevent the string from slipping, the folding box is high in strength, dirt of the folding box can be easily removed, and the folding box can be cleaned and reused many times, and it is possible to prevent collapse of folding boxes with a simple structure even if the folding boxes are vertically stacked in multiple stages when each folding box is folded flatly or when each folding box is assembled into a box form.

In order to attain the object, a folding box made of synthetic resin according to the present invention is a folding box made of synthetic resin which turns into a hexahedral box when it is assembled into a box form. The folding box includes a rectangular-tube shaped side wall configuration member 3 which becomes a rectangular or square shape in a plan view in a state where the folding box is assembled into a box form. The rectangular-tube shaped side wall configuration member 3 are comprised of four side panels 1 made of hard synthetic resin for constructing front/rear/left/right side surfaces, and adjacent side ends of the four side panels 1 are foldably connected to each other through side panel connecting hinge parts 2. The rectangular-tube shaped side wall configuration member 3 is configured to be able to be folded flatly by folding the side panels into an approximate parallelogram form in such a way that each corner of one pair of diagonal corners becomes an acute angle and each corner of the other pair of diagonal corners becomes an obtuse angle. The folding box further includes a bottom plate configuration member 6 which is to be a bottom of the folding box when the folding box is assembled into the box form. The bottom plate configuration member 6 is comprised of connecting bottom pieces 4 made of hard synthetic resin, which are foldably connected to bottom ends of the plurality of side panels 1 through bottom piece connecting hinge parts 5. The folding box further includes a lid configuration member 7 which is to be a lid of an upper surface of the folding box when the folding box is assembled into the box form. The lid configuration member 7 is comprised of lid pieces 15 made of hard synthetic resin, which are foldably connected to upper ends of the plurality of side panels 1 through lid piece connecting hinge parts 10. The side panel connecting hinge parts 2, the bottom piece connecting hinge parts 5, and the lid piece connecting hinge parts 10 are made of soft synthetic resin, both ends of each hinge part are integrated, in overlapping relation, with outer surfaces of the side panels 1, the bottom pieces 4, or the lid pieces 15, which are made of the hard synthetic resin, by using two-color molding of synthetic resins so that they are flush with the outer surfaces or they jut out from the outer surfaces, the soft synthetic resin of each hinge part which is integrated, in overlapping relation, with the outer surfaces of the side panels 1, the bottom pieces 4, or the lid pieces 15, which are made of the hard synthetic resin, is exposed to the outside in neighborhood of an edge of the hexahedral box on either or both of the surfaces of the hexahedral box which are adjacent to each other at right angles through the edge of the hexahedral box when the folding box is assembled into the hexahedral box so as to form nonslip parts 13, and the nonslip parts are formed in every neighborhood of the edges of the hexahedral box.

With such structure, it is possible to provide a folding box A made of synthetic resin which can be folded in the same manner as a folding box made of cardboard and can be assembled into a box form in the same manner and is compatible with the folding box made of cardboard. Moreover, while being compatible with the folding box made of cardboard, since the folding box A is made of the synthetic resin, the folding box is high in strength, dirt thereof can be easily removed, and the folding box A can be cleaned and reused many times. When the folding box A made of synthetic resin is folded flatly, the inner surfaces of the respective side panels 1 are not exposed to the outside and are not soiled, and contents stored in the box are not soiled when the folding box A is reused. Furthermore, the nonslip part 13 made of soft synthetic resin and exposed to the outside in the neighborhood of the edge of the hexahedral box on either or both of the surfaces of the hexahedral box which are adjacent to each other at rights angles through the edge of the hexahedral box is provided and furthermore the nonslip parts 13 are formed in the neighborhood of every edge of the hexahedral box. Thus, a worker can surely and stably carry the folding box A without a slip whichever edges of the folding box A the worker grips with hands. In particular, both the ends of each hinge part made of the soft synthetic resin are integrated, in overlapping relation, with the outer surfaces of the side panels 1, the bottom pieces 4, or the lid pieces 15, which are made of the hard synthetic resin, by using the two-color molding so that they are flush with the outer surfaces or they jut out from the outer surfaces, and the nonslip parts 13 are formed by the soft synthetic resin of each hinge part which is integrated, in overlapping relation, with the outer surfaces by using the two-color molding. Thus, it is possible to easily form the nonslip parts 13 made of soft synthetic resin having a relatively large area which can surely prevent slip of hands and fingers with friction by surface contact in the neighborhood of every edge of the hexahedron. Therefore, even if persons having different sizes and lengths of hands and fingers carry the box by gripping whichever edges of the hexahedron of the box with both the hands or even if a state of bending of the hands and the fingers in carrying the box is different, the hands and the fingers surely come into surface contact with the nonslip parts 13 to prevent a slip, and the slip is surely prevented. When the folding box A made of synthetic resin is tied with a string in a state where the folding box A is assembled into a box form, although the string tends to slip, since the nonslip parts 13 made of soft synthetic resin are provided in the neighborhood of every edges of the hexahedron, the sting can come into line contact with the nonslip parts 13 having a relatively large area and is prevented from slipping, and a tied and bounded position of the folding box A does not shift. Although the folding box A is made of synthetic resin, even if the folding boxes are folded flatly and vertically stacked in multiple stages in transporting or storing the folding box, since the nonslip parts 13 made of soft synthetic resin are present in overlapping parts between the upper and lower folding boxes A made of synthetic resin folded flatly, a slip of the folding boxes is prevented. As a result, even if the folding boxes A made of synthetic resin are vertically stacked in a state where the folding boxes A are folded flatly, collapse of the folding boxes A is prevented. Moreover, even if the folding boxes A are stacked vertically with some misalignment in a state where the folding boxes A are folded flatly or stacked with a direction thereof changed, since slip of the folding boxes A can be surely prevented by the nonslip parts 13, the folding boxes A can be stably stacked. When the nonslip parts 13 are located on an upper surface or a lower surface of the folding box A in a state where the folding box A is assembled into a box form, the slip of the folding boxes A vertically stacked in that state is prevented, and the collapse of the folding boxes A is prevented.

Since the side panel connecting hinge parts 2 made of soft synthetic resin which foldably connect the side panels 1, the bottom piece connecting hinge parts 5 made of soft synthetic resin which foldably connect the side panels 1 and the bottom pieces 4, and the lid piece connecting hinge parts 10 made of soft synthetic resin which foldably connect the side panels 1 and the lid pieces 15 can be used as the nonslip parts 13 as well, respectively, it is possible to simplify the structure of the folding box A. Moreover, the side panels 1, the bottom pieces 4, and the lid pieces 15 made of hard synthetic resin and the side panel connecting hinge parts 2, the bottom piece connecting hinge parts 5, and the lid piece connecting hinge parts 10 made of soft synthetic resin are integrally molded by two-color molding of the synthetic resins. Thus, the side panels 1, the bottom pieces 4, and the lid pieces 15 and the side panel connecting hinge parts 2, the bottom piece connecting hinge parts 5, and the lid piece connecting hinge parts 10 which are used as the nonslip parts 13 as well are firmly integrated and the nonslip parts 13 do not peel off from the side panels 1, the bottom pieces 4, and the lid pieces 15. Compared with a thin hinge made of hard synthetic resin, the side panel connecting hinge parts 2, the bottom piece connecting hinge parts 5, and the lid piece connecting hinge parts 10 made of soft synthetic resin are less likely to be damaged even if the hinge parts are repeatedly used, and they have long life.

It is preferable that each of the nonslip parts 13 made of soft synthetic resin has a strip shape and it is provided over the entire length or approximately the entire length of the edge.

With such structure, in gripping an opposed pair of edges at bottom ends with both the hands in a state where the folding box A is assembled into a box form, whichever parts in a longitudinal direction of the pair of edges are gripped by the hands, the worker can surely grip the folding box A by pressing the hands against some parts of the nonslip parts 13 of the strip shape to be in a surface contact state, and can carry the folding box A without a slip of the hands in whatever way the worker carries the folding box A. Furthermore, in tying the folding box A with a string, the string can be tied in the nonslip parts 13 and can be prevented from slipping. Moreover, since the nonslip part 13 of the strip shape is provided over the entire length or approximately the entire length of the edge, when the folding boxes A are vertically stacked in multiple stages in a state where the folding boxes A are folded flatly or assembled into a box form, the slip of the folding boxes A can be surely prevented even if the folding boxes A are somewhat misaligned laterally.

It is preferable that a part corresponding to the middle part in length direction of the edge of each nonslip part 13 made of soft synthetic resin provided along the entire length or approximately the entire length of the edge is wider than the other part of the nonslip part 13.

With such structure, even when the worker grips the opposed pair of edges at the bottom ends in a state where the folding box A is assembled into a box form, since the nonslip parts 13 made of soft synthetic resin are wide in positions most generally gripped by the hands, an area in which the hands are pressed against the nonslip parts 13 in the surface contact state is increased, and the worker can surely grip the folding box A by touching the nonslip parts 13 with the hands. Moreover, although the soft synthetic resin is expensive, it is possible to reduce a quantity of use of the expensive soft synthetic resin and reduce cost compared with a case in which the nonslip parts 13 are formed wide over the entire length of the edges.

It is preferable that the nonslip parts 13 made of soft synthetic resin exposed to the outside are provided on outer surfaces at corner parts of the hexahedral box.

Since the nonslip parts 13 made of soft synthetic resin exposed to the outside are provided on the outer surfaces at the corner parts of the hexahedral box in this way, as shown in FIG. 15, even when the worker holds the folding box A by gripping the corner parts of the hexahedron, it is possible to surely prevent the hands from slipping.

It is preferable that the nonslip parts 13 are provided in neighborhoods of the four edges of the respective outer surfaces of the four side panels 1 respectively.

With such structure, the worker can surely grip the folding box A without a slip of the hands whichever parts of the four ends of the four side panels 1 the worker touches.

It is preferable that the nonslip parts 13 made of soft synthetic resin exposed to the outside are provided over the entire length of the four edges of the outer surface of each side panel 1, and the nonslip parts 13 made of soft synthetic resin are also provided at the corner parts of the outer surface of each side panel 1, and the nonslip parts 13 along the adjacent edges are integrally continued to each other through the nonslip parts 13 at the corner parts to form the nonslip parts 13 having a square shape over the entire length of the outer periphery of the outer surface of each side panel 1.

With such structure, the worker can surely grip the folding box A without a slip of the hands whichever parts of the four ends and the respective corner parts of the four side panels 1. Since the respective nonslip parts 13 along the four edges integrally continue at the corner parts, it is possible to surely prevent peeling of the nonslip parts 13.

It is preferable that the folding box A is assembled by coupling two box half bodies 12, each of the box half bodies 12 is integrally molded by the two-color molding of the hard synthetic resin and the soft synthetic resin (also referred to as a two-color molding method or a different materials molding method by a two-color molding machine), each of the box half bodies 12 includes two side panels 1 made of the hard synthetic resin which are integrally continued to each other at respective one side ends through the side panel connecting hinge part 2 made of the soft synthetic resin, the bottom piece(s) 4 integrally continued to the bottom end(s) of above one or two side panels 1 through the bottom piece connecting hinge part(s) 5 made of the soft synthetic resin, and the lid piece(s) 15 integrally continued to the upper end(s) of above one or two side panels 1 through the lid piece connecting hinge part(s) 10 made of the soft synthetic resin, the rectangular-tube shaped side wall configuration member 3 having four side panels 1 is configured by foldably connecting the other side ends of the two side panels 1 of one box half body 12 to the other side ends of the two side panels 1 of the other box half body 12, the bottom plate configuration member 6 is configured by the bottom pieces 4 of the two box half bodies 12, and the lid configuration member 7 is configured by the lid pieces 15 of said two box half bodies 12.

With such a structure, the folding box A made of synthetic resin of the present invention can be formed by combining and coupling the two half box bodies 12 in which the side panels 1, the bottom pieces 4, and the lid pieces 15 made of hard synthetic resin and the hinge parts made of soft synthetic resin are integrally molded by the two-color molding of the synthetic resins. So, a die for forming the folding box A made of synthetic resin can be reduced in size and a reduction in manufacturing cost can be realized.

BEST MODE FOR CARRYING OUT THE INVENTION

The present invention will be hereinafter explained on the basis of an embodiment shown in the accompanying drawings.

A main body of a folding box A made of synthetic resin of the present invention includes a rectangular-tube shaped side wall configuration member 3, a bottom plate configuration member 6, and a lid configuration member 7.

Figure 1:
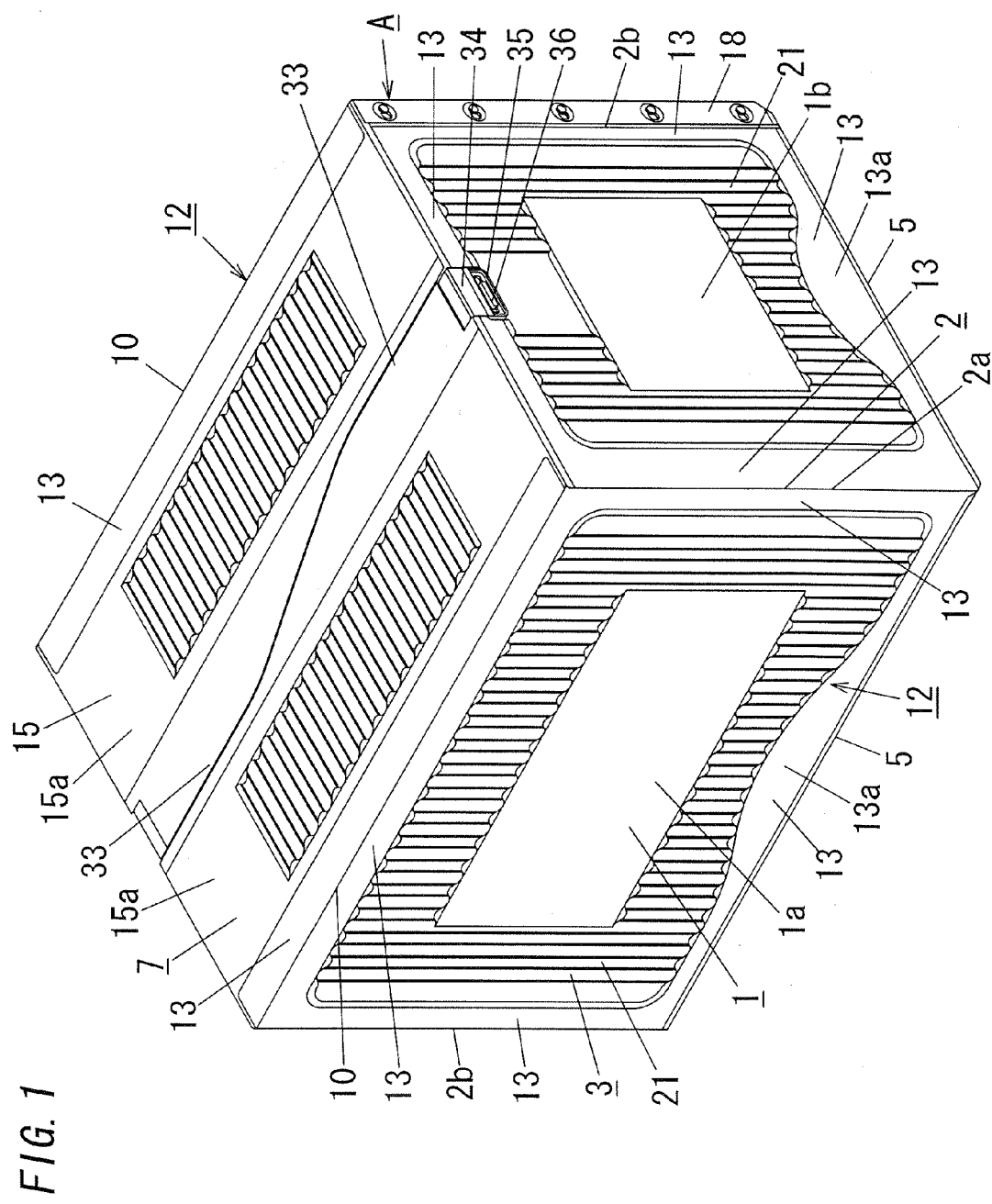
FIG. 1 is a perspective view, viewed from above, of a folding box made of synthetic resin of the present invention assembled into a box form.
Figure 2:
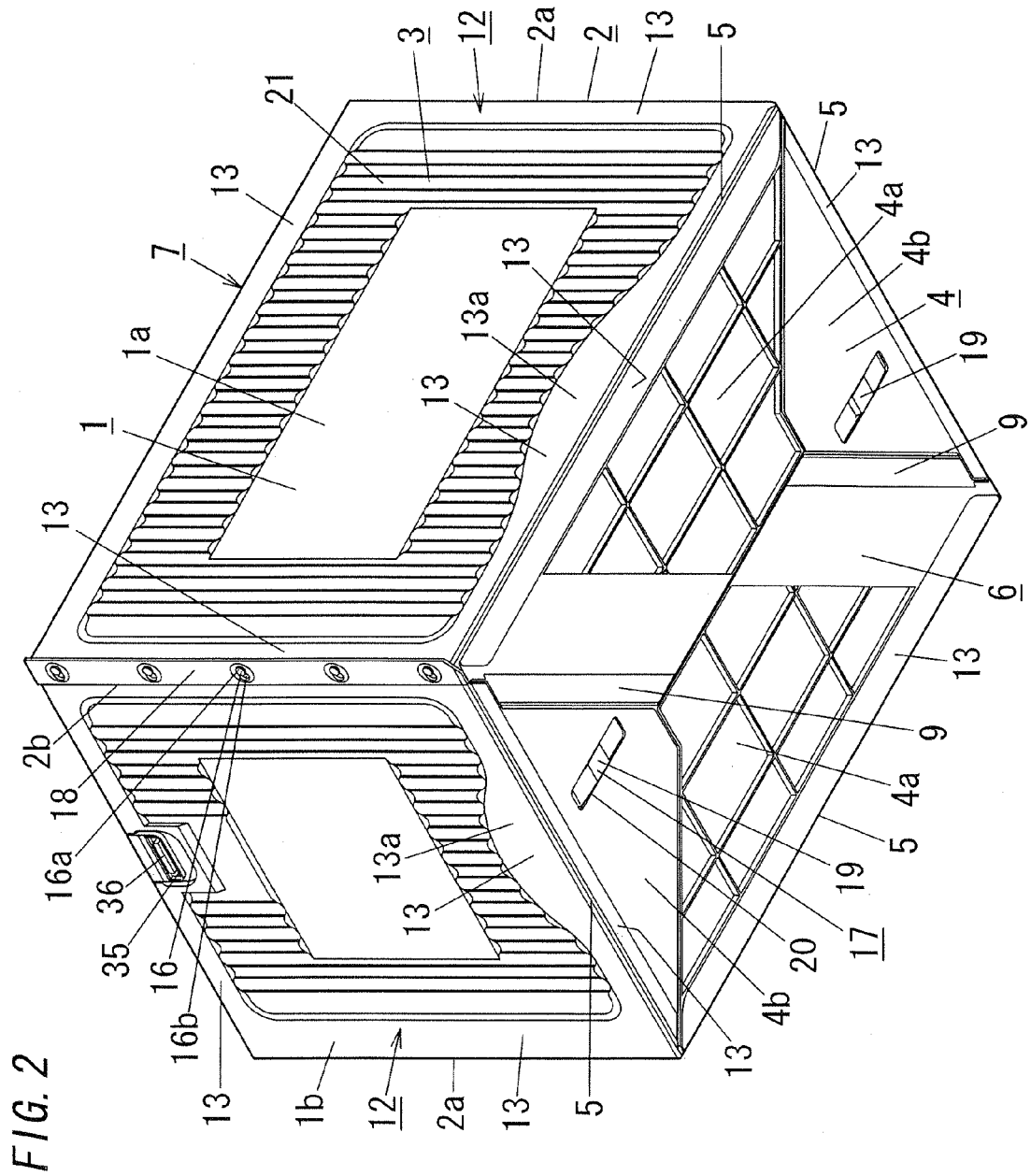
FIG. 2 is a perspective view, viewed from below, of the folding box made of synthetic resin of the present invention assembled into the box form.
Figure 3:
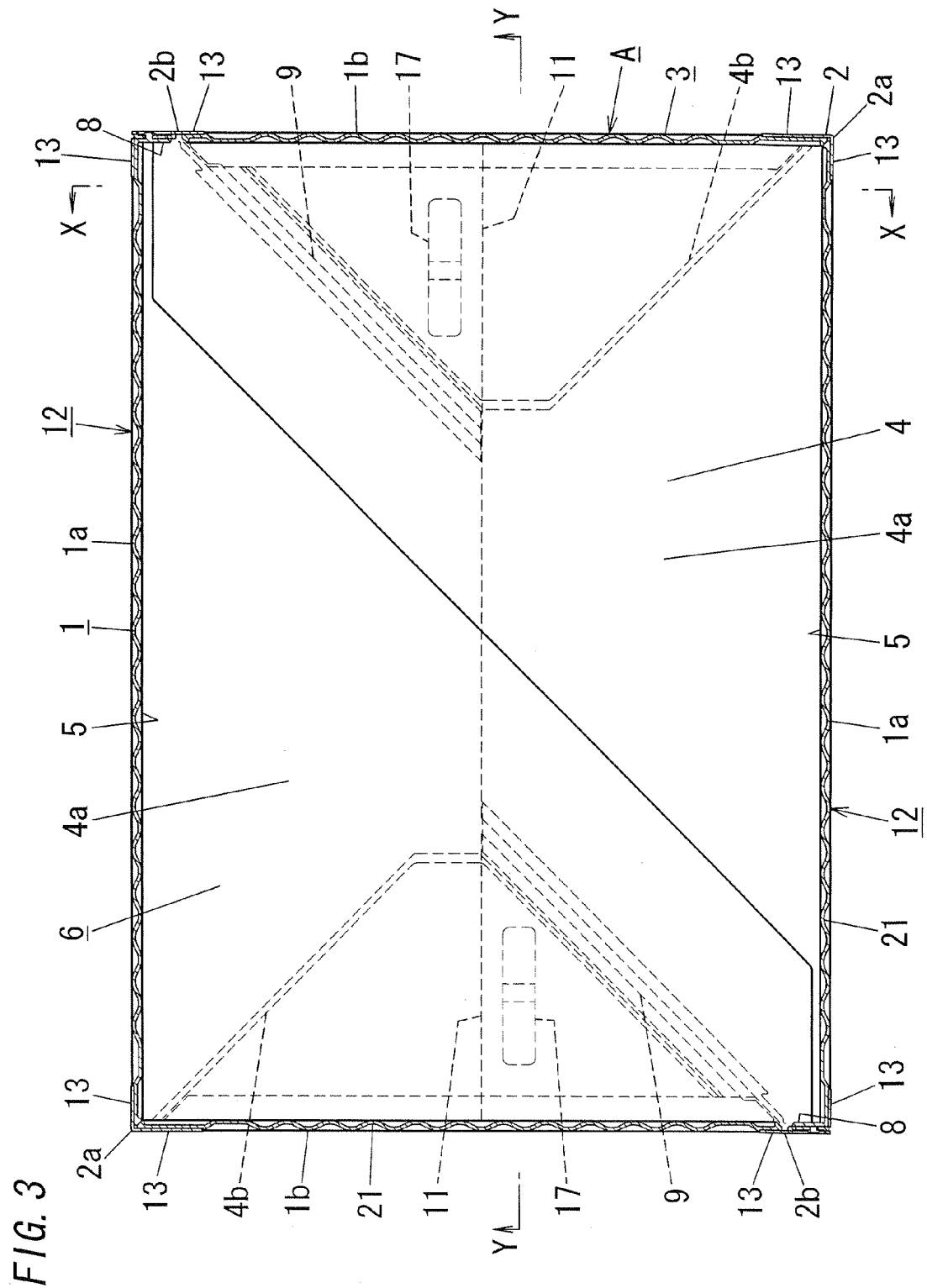
FIG. 3 is a plan sectional view of the folding box assembled into the box form.
Figure 5:
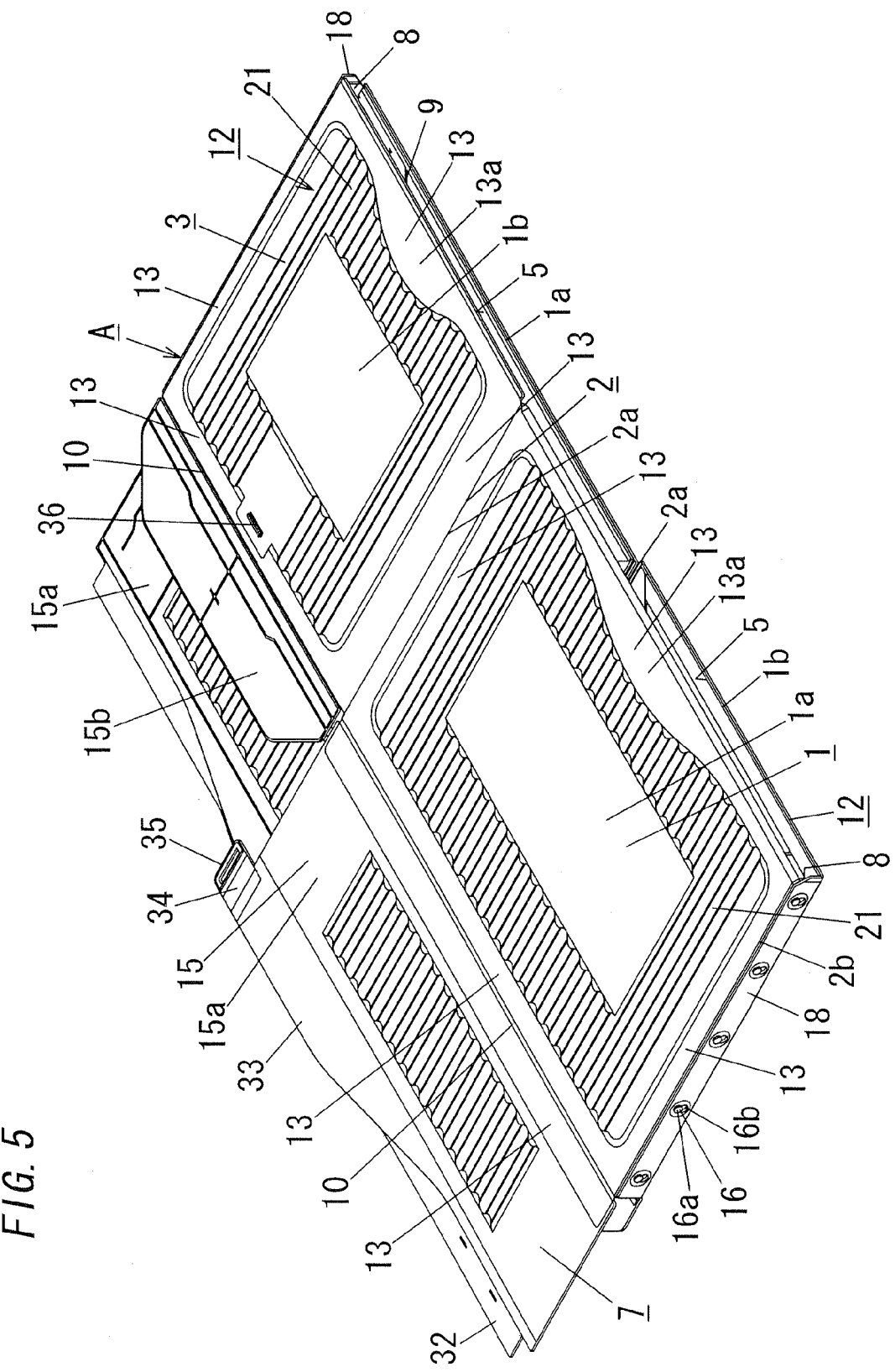
FIG. 5 is a perspective view of the folding box which is folded.
Figure 6:
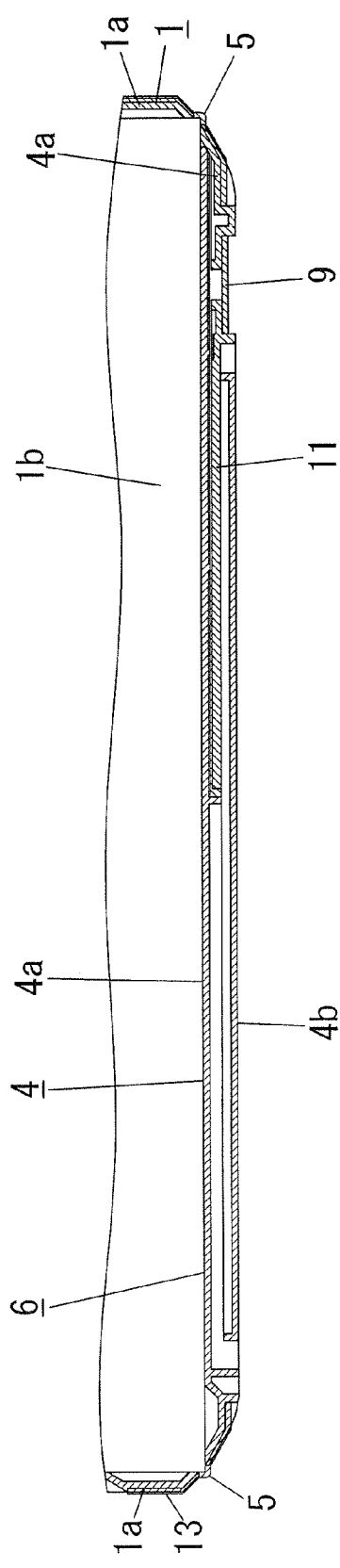
FIG. 6 is a sectional view of the folding box taken along a line X-X in FIG. 3.
Figure 8A:
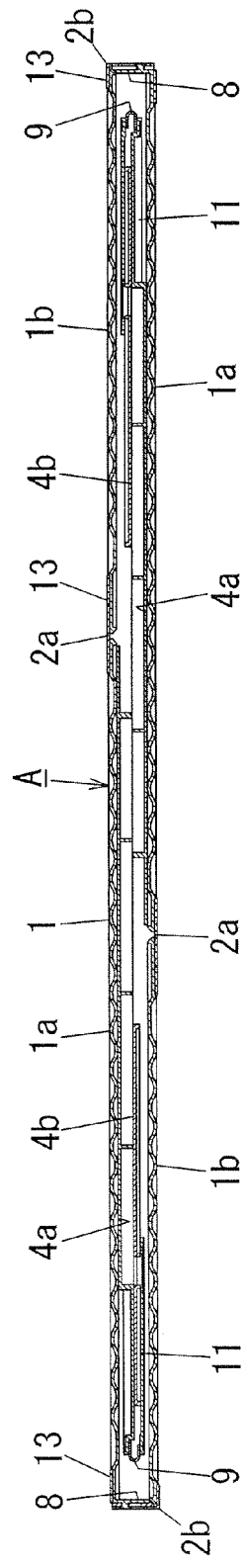
FIG. 8A is a sectional view of the folding box which is folded.
Figure 8B:
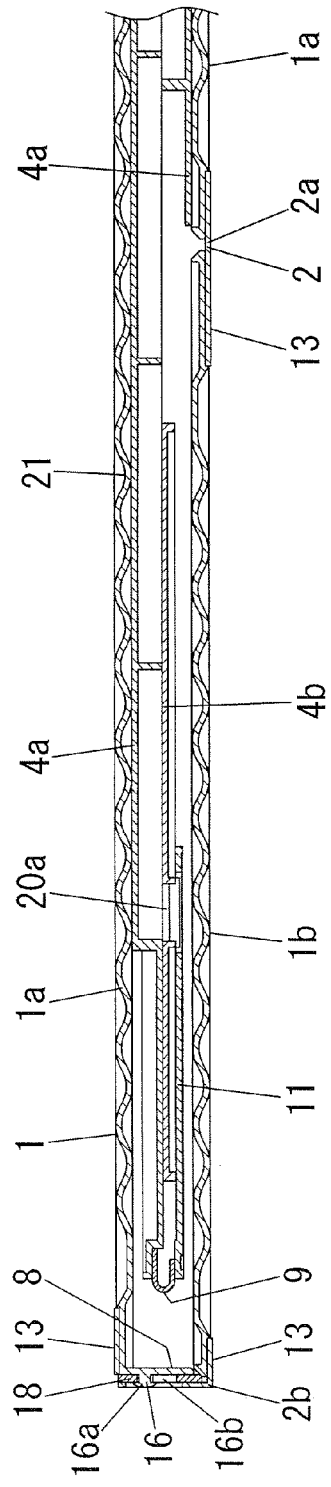
FIG. 8B is a main part enlarged sectional view of FIG. 8A.
Figure 9:
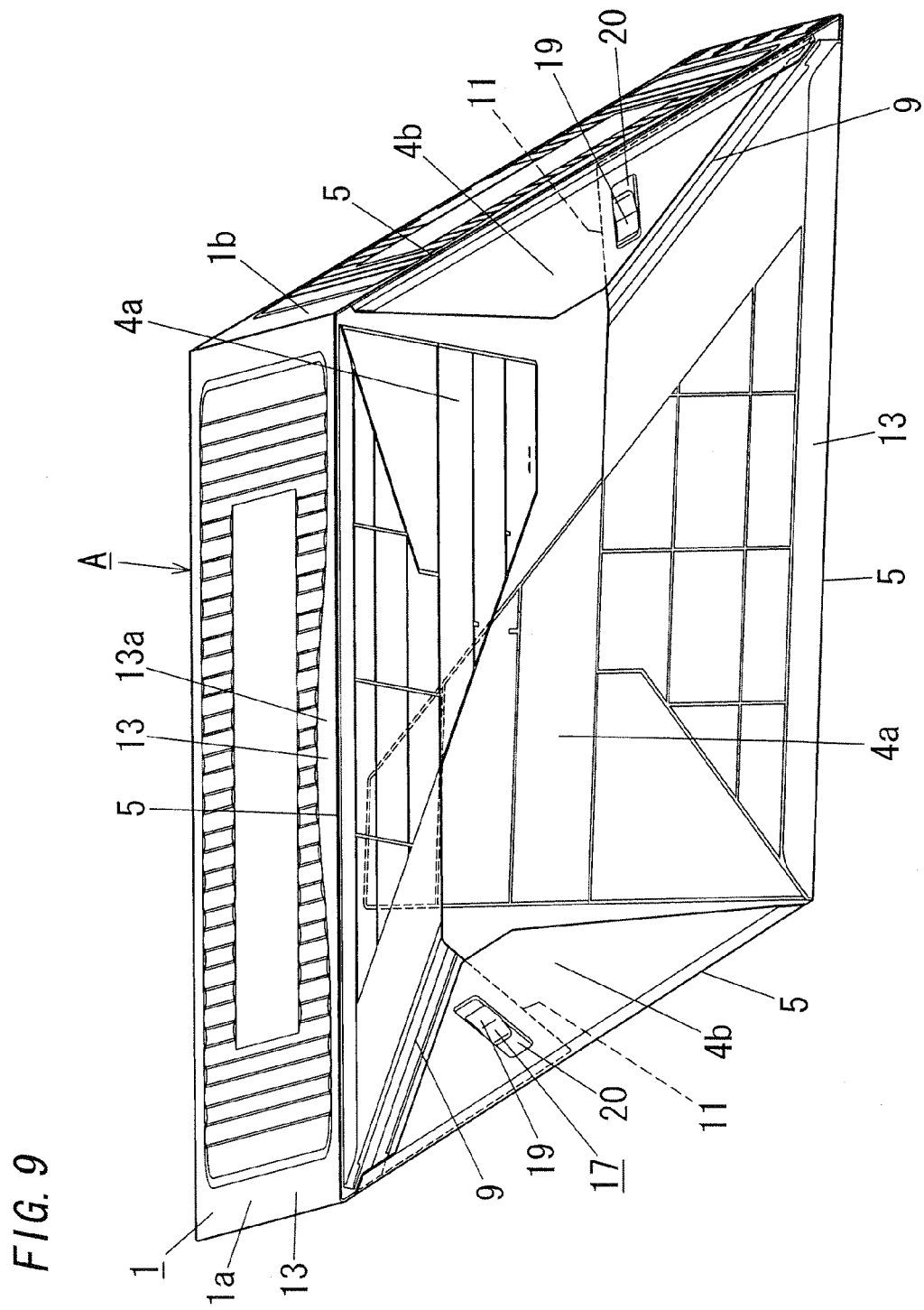
FIG. 9 is a perspective view, viewed from below, of the folding box which is being folded.

As shown in FIGS. 1 to 3, the rectangular-tube shaped side wall configuration member 3 is configured by foldably connecting adjacent side ends of four side panels 1 made of hard synthetic resin, which construct respective side surfaces in the front, rear, left, and right, through a side panel connecting hinge part 2 made of soft synthetic resin and are formed in a rectangular or square shape in a plan view (i.e., a square tube shape) in a state where the folding box A is assembled into a box form. As shown in FIG. 9, this rectangular-tube shaped side wall configuration member 3 is configured to be able to be folded flatly as shown in FIGS. 5, 8A, and 8B by being folded into an approximate parallelogram form in such a way that each corner of one pair of diagonal corners becomes an acute angle and each corner of the other pair of diagonal corners becomes an obtuse angle. In this embodiment, an example in which the rectangular-tube shaped side wall configuration member 3 becomes a rectangular shape in a plan view in a state where the folding box A is assembled into a box form is described. However, the rectangular-tube shaped side wall configuration member 3 may be a square shape in a plan view in a state where the folding box A is assembled into a box form.

Figure 4:
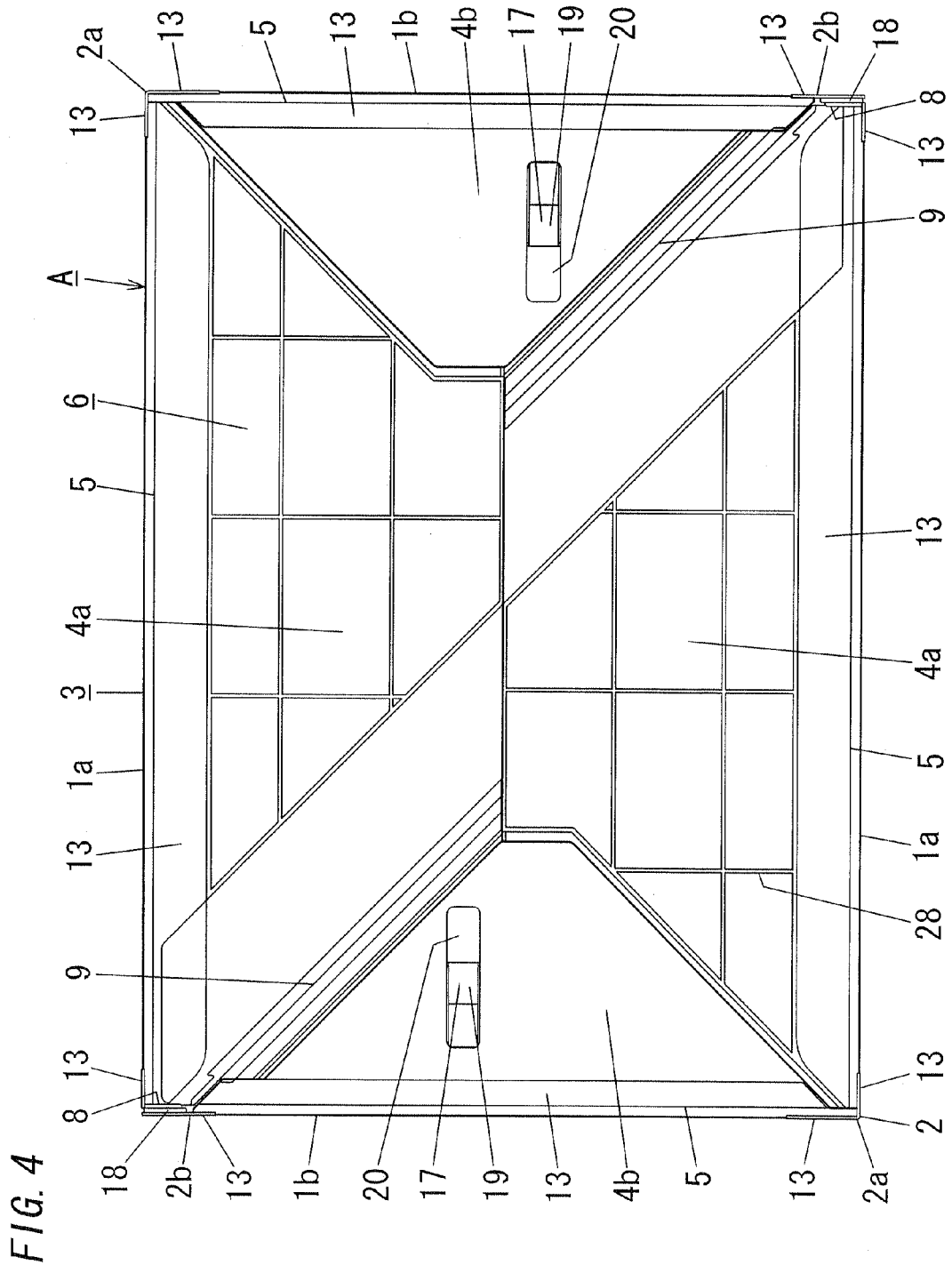
FIG. 4 is a bottom view of the folding box assembled into the box form.

As shown in FIGS. 2 and 4, bottom pieces 4 made of hard synthetic resin are foldably connected integrally to above mentioned bottom ends of the four side panels 1 made of hard synthetic resin, which form the respective side surfaces in the front, rear, left, and right, through bottom piece connecting hinge parts 5 made of soft synthetic resin, respectively. A bottom plate configuration member 6 made of synthetic resin is formed by the four bottom pieces 4 made of hard synthetic resin. Each of the bottom pieces 4 rotates around the bottom piece connecting hinge part 5 to approach an inner surface side of the side panel 1 when the rectangular-tube shaped side wall configuration member 3 is folded into an approximate parallelogram form. At a final stage of the folding, the bottom piece 4 is folded to overlap the inner surface of the side panel 1 as shown in FIGS. 8A and 8B.

In the rectangular-tube shaped side wall configuration member 3, as shown in FIGS. 8A and 8B, on an inner surface of an end (an end on the corner side) of one side panel 1a (a side panel along a longitudinal direction) among two side panels 1 (1a and 1b) on both side of each corner of one pair of diagonal corners to be folded to be an acute angle when the rectangular-tube shaped side wall configuration member 3 is folded in the approximate parallelogram form, a projected piece to be an overlapping margin absorbing projection 8 is integrally provided vertically along a height direction of the side panel 1a at a right angle with respect to the side panel 1a.

The overlapping margin absorbing projection 8 is set to height (length in a latitudinal direction) corresponding to overlap thickness in a folded state where the four side panels 1 are folded into the approximate parallelogram form and the respective bottom pieces 4 overlap the inner surfaces of the respective side panels 1.

Figure 12:
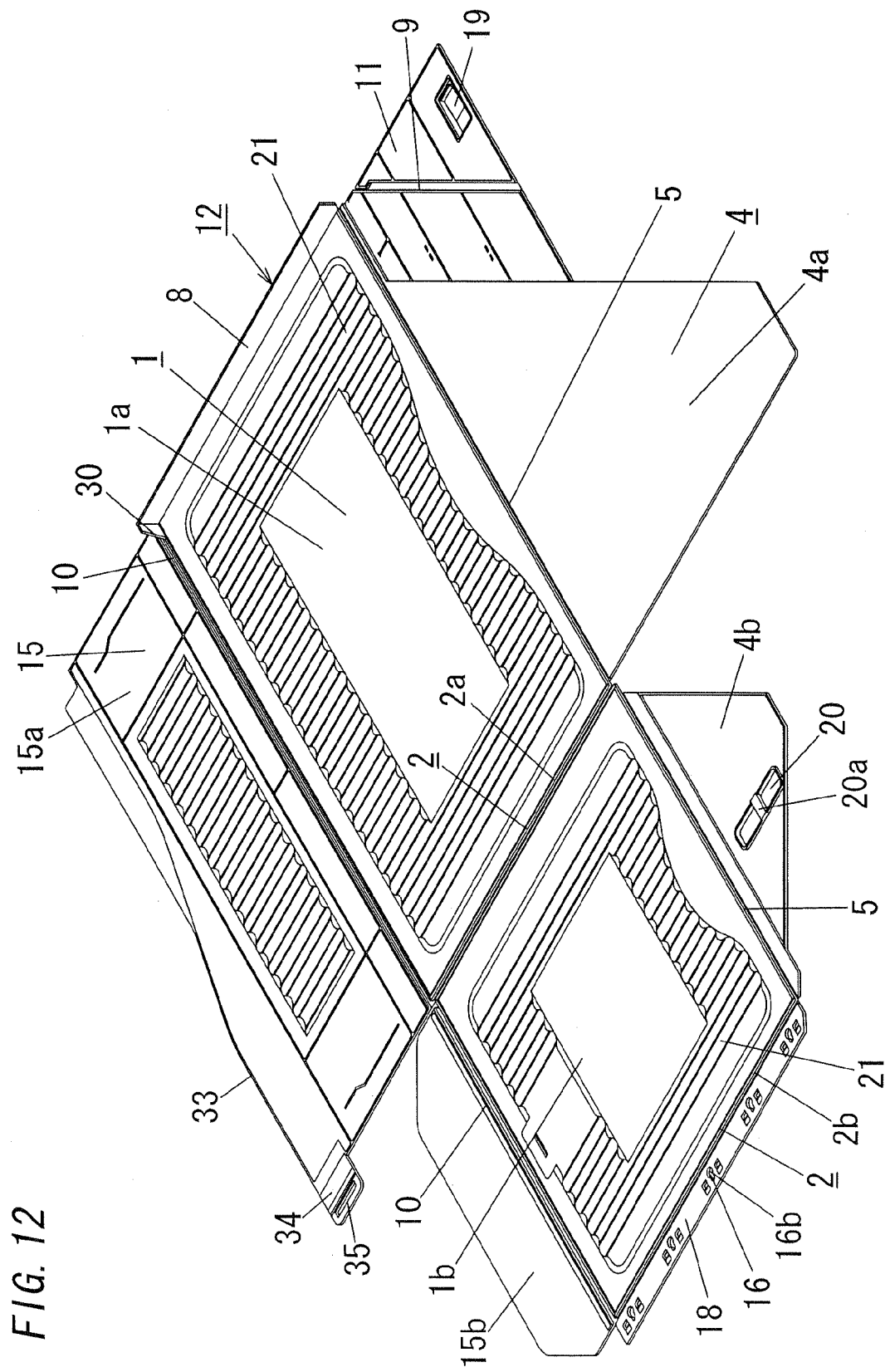
FIG. 12 is a perspective view, viewed from the front, of a box half body of the folding box in a molded state.

As shown in FIG. 12, corner parts formed by an upper end of the side panel 1a and an upper end of the overlapping margin absorbing projection 8 are integrally connected by a corner connecting part 30. An upper surface of the corner connecting part 30 is a supporting part for placing a part of a lid piece 15 described later in a state where the lid piece 15 is closed. This corner connecting part 30 is formed in an approximate right-angled triangular shape in a plan view and extended to a distal end of the overlapping margin absorbing projection 8.

A fastened part 36 in which a fastening tool 35 described later is to be locked is provided at an upper end of the other side panel 1b.

An overlapping piece 11 is formed on one side of the bottom piece 4 continuously extended from the one side panel 1a (hereinafter referred to as bottom piece 4a) through an inclined hinge part 9 made of soft synthetic resin inclined at an acute angle (in this embodiment, 45°) with respect to bottom ends of both the side panels 1a and 1b in a plan view, respectively, at the time when the folding box A is assembled into a box form.

Figure 10A:
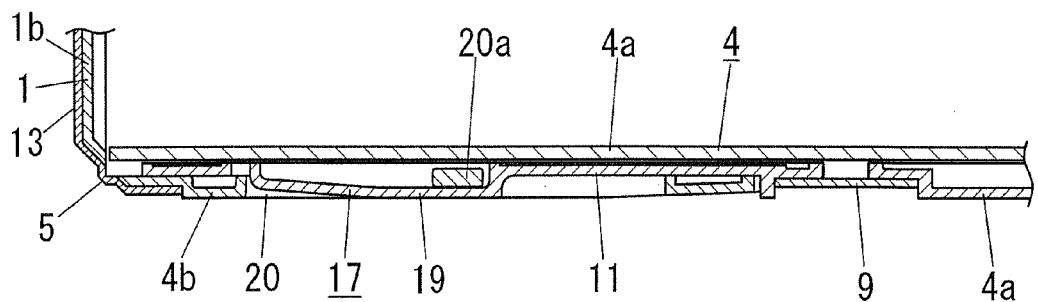
FIG. 10A is a sectional view of a part of the folding box where an overlapping piece and a bottom piece are coupled by a slide coupling means.
Figure 10B:
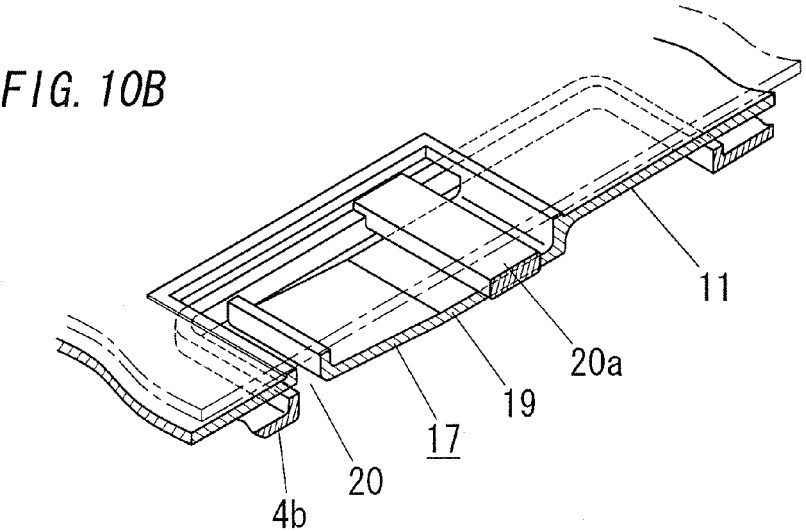
FIG. 10B is a partially cut away perspective view of the part of the folding box where the overlapping piece and the bottom piece are coupled by the slide coupling means.

As shown in FIGS. 10A and 10B, the overlapping piece 11 is slidably coupled to the bottom piece 4 by a slide coupling means 17 in a state where the overlapping piece 11 overlaps the bottom piece 4 continuously extended from the bottom end of the other side panel 1b through the bottom piece connecting hinge part 5 (hereinafter referred to as bottom piece 4b).

Both the bottom pieces 4 adjacent each other at each corner of one pair of diagonal corners folded into an obtuse angle when the rectangular-tube shaped side wall configuration member 3 is folded into an approximate parallelogram form are not connected to each other and in a relation free from each other.

The lid pieces 15 made of hard synthetic resin are foldably connected to upper ends of a plurality of side panels 1 made of hard synthetic resin through lid piece connecting hinge parts 10 made by soft synthetic resin, whereby the lid configuration member 7 to be a lid, which is an upper surface of a box when the folding box A is assembled in a box form, is formed.

In this embodiment, upper lid pieces 15a each having a length same as the length of an upper end edge of the side panel 1a are foldably extended from the upper end edges through the lid piece connecting hinge parts 10. Lower lid pieces 15b each having a length same as the length of upper end edge of the other side panel 1b are foldably extended from the upper end edges through the lid piece connecting hinge parts 10.

One side half of each distal end edge of one pair of lid pieces 15a is provided with a placing recess 32, an upper surface of which is stepped down, and the other side half is provided with a placing projected piece 33, a lower surface of which is stepped down. One pair of lid pieces 15 has a positional relation in which the placing recess 32 provided in one lid piece 15a is opposed to the placing projected piece 33 provided in the other lid piece 15a and the placing projected piece 33 provided in one lid piece 15a is opposed to the placing recess 32 provided in the other lid piece 15a. When one pair of lid pieces 15a is laid and an upper opening of the box is closed, the respective placing projected pieces 33 are placed, in overlapping relation, on the placing recesses 32 of the respective lid pieces 15a opposed thereto. Furthermore, belt members 34 made of soft synthetic resin are integrally projected from one sides of the respective lid pieces 15a, and fastening tools 35 made of hard synthetic resin are integrally formed at distal ends of the belt members 34.

The present invention is characterized in that the nonslip parts 13 made of soft synthetic resin are provided to be exposed to the outside in the neighborhood of every edge (twelve edges) of the hexahedron of the folding box A, the main body of which is formed of hard synthetic resin, and the nonslip parts 13 made of soft synthetic resin are formed by the side panel connecting hinge parts 2, the bottom piece connecting hinge parts 5, the inclined hinge parts 9, and the lid piece connecting hinge parts 10 made of soft synthetic resin which connect between the side panel 1 and the side panel 1, the side panels 1 and the bottom pieces 4, the bottom pieces 4 and the overlapping pieces 11, and the side panels 1 and the lid pieces 15, respectively, and are integrated, in overlapping relation, with the outer surfaces of the side panels 1, the bottom pieces 4, the overlapping pieces 11, and the lid pieces 15. In other words, since the parts integrated, in overlapping relation, with the outer surfaces of the side panels 1, the bottom pieces 4, the overlapping pieces 11, and the lid pieces 15 of each hinge parts made of soft synthetic resin are the nonslip parts 13, it is possible to form the nonslip parts 13 having a sufficient area for coming into surface contact with hands and fingers and preventing slip with friction when the worker touches the nonslip parts 13 with the hands and the fingers.

In this embodiment, as described above, the nonslip parts 13 made of soft synthetic resin having a strip shape are provided along the entire lengths of the respective edges near the four edges above and blow and on the left and right of each outer surface of the four side panels 1 forming the four sides. Furthermore, the nonslip parts 13 made of soft synthetic resin exposed to the outside are provided on the outer surfaces of the corner parts of the respective side panels 1, and the nonslip parts 13 along the adjacent edges are integrally connected each other through the nonslip parts 13 at the corner parts to form the nonslip parts 13 having a square shape over the entire length of the outer periphery of the outer surface of each side panel 1. Moreover, in the nonslip part 13 of the strip shape provided along the entire length or approximately the entire length of the bottom edge of the each side panel 1, the part corresponding to the middle part in the length direction of the edge are the wide nonslip part 13a which is wider than the other parts. Still furthermore, the nonslip parts 13 made of soft synthetic resin of the strip shape are provided near the edges on the sides adjacent to the side panels 1 of the outer surfaces (lower surfaces) of the respective bottom pieces 4 along the edges. Moreover, the nonslip parts 13 made of soft synthetic resin of the strip shape are provided near the edges on the sides adjacent to the side panels 1 of the outer surfaces (upper surfaces) of the respective lid pieces 15 along the edges.

Here, when the nonslip parts 13 made of soft synthetic resin are provided to be exposed to the outside on the respective outer surfaces of the side panels 1, the bottom pieces 4, and the lid pieces 15, the nonslip parts 13, in this embodiment, are configured to be jutted out (in other words, projected) from the outer surfaces to the outside in the side panels 1 and the lid pieces 15, respectively, so that a nonslip effect and a buffer effect can be performed more. In this embodiment, the nonslip parts 13 exposed on the outer surfaces of the bottom pieces 4 are exposed on stepped surfaces formed on the outer surfaces of the bottom pieces 4 made of hard synthetic resin and located in positions slightly shifting upward from the lowermost ends of the bottom pieces 4. However, the nonslip parts 13 provided in the bottom pieces 4 may be provided to be projected to further downward (outward) than the outer surfaces of the bottom pieces 4. The nonslip parts 13 may be flush with the outer surfaces of the side panels 1, the bottom pieces 4, and the lid pieces 15 in all or a part of the side panels 1, the bottom pieces 4, and the lid pieces 15.

Figure 13:
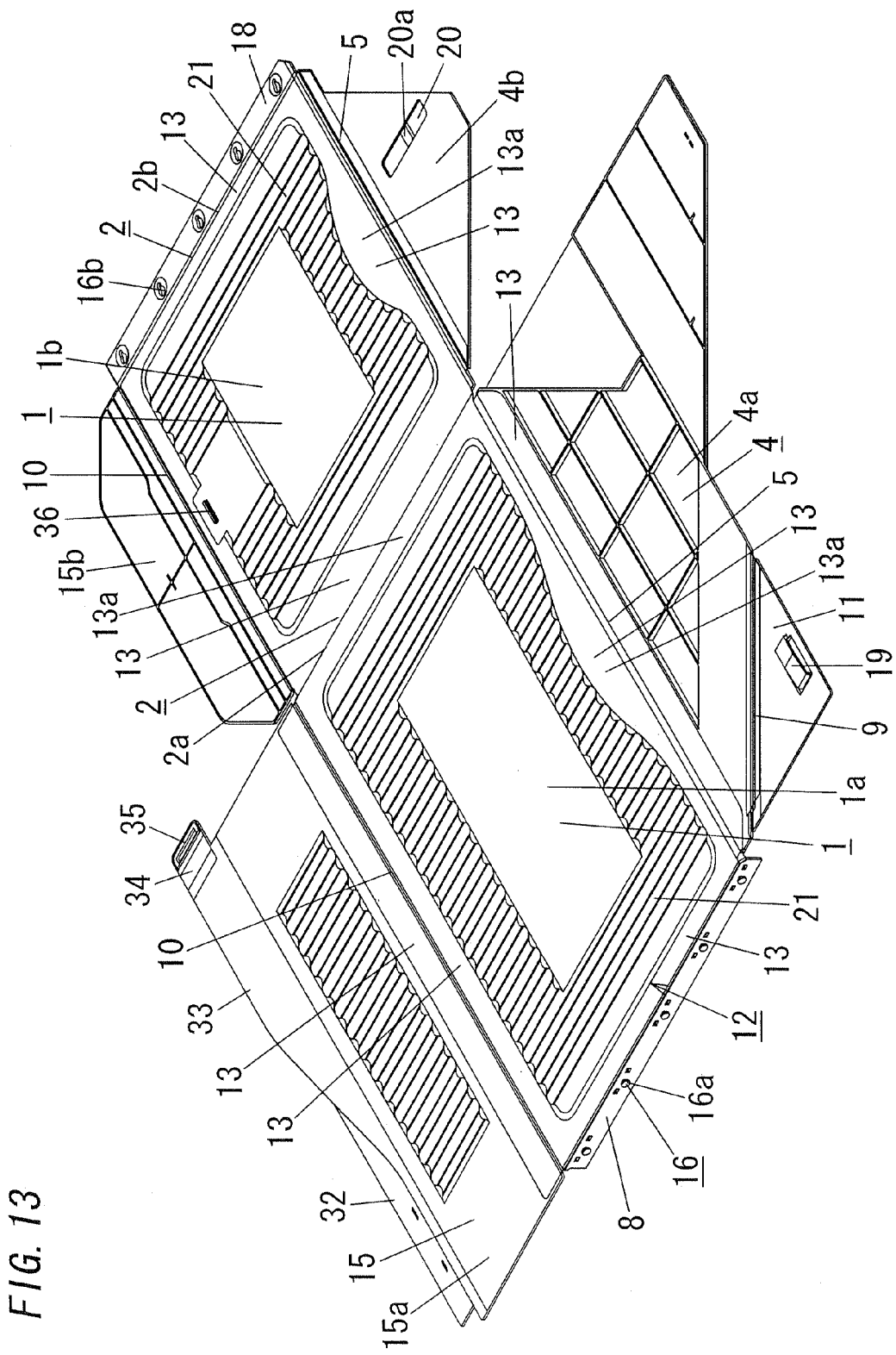
FIG. 13 is a perspective view, viewed from the rear, of the box half body of the folding box in the molded state.

In this embodiment, the folding box A made of synthetic resin having the structure described above is formed by combining and connecting the two box half bodies 12 shown in FIGS. 12 and 13 formed by integral molding of the synthetic resins.

As shown in exploded views in FIGS. 12 and 13, in the box half bodies 12, the side ends of the adjacent pair of side panels 1a and 1b are connected to each other by the side panel connecting hinge parts 2 (hereinafter referred to as side panel connecting hinge parts 2a). At a side end of the one side panel 1a not connected by the side panel connecting hinge part 2a, the overlapping margin absorbing projection 8 is projected along the side end of the side panel 1a toward an inner surface side. The corner part formed by the upper end of the overlapping margin absorbing projection 8 and the upper end of the side panel 1a is integrally connected to each other by the corner connecting part 30. Moreover, at a side end of the other side panel 1b not connected by the side panel connecting hinge part 2a, another side panel connecting hinge part 2 (hereinafter referred to as side panel connecting hinge part 2b) is provided. A connecting part 18 is provided at a distal end of the side panel connecting hinge part 2b. The bottom pieces 4a and 4b are continuously extended from respective bottom ends of the adjacent pair of side panels 1a and 1b through the bottom piece connecting hinge parts 5 respectively. Moreover, the overlapping pieces 11 are continuously extended from a side end of one bottom piece 4a on the side opposite to the other bottom piece 4b adjacent thereto through the inclined hinge parts 9 inclined at an acute angle (in this embodiment, 45°) with respect to the bottom piece connecting hinge parts 5. Furthermore, the lid pieces 15 are continuously extended from the upper ends of the side panels 1 through the lid piece connecting hinge parts 10. The box half bodies 12 having the structure described above are integrally molded by two-color injection molding of synthetic resins. The side panels 1, the bottom pieces 4, the overlapping pieces 11, the lid pieces 15, the overlapping margin absorbing projections 8, the corner connecting parts 30, and the fastening tools 35 are molded from hard resin such as PP (polypropylene), PE (polyethylene), HDPE (high density polyethylene), PC (polycarbonate), PVC (polyvinyl chloride resin), or ABS resin. The side panel connecting hinge parts 2a and 2b, the bottom piece connecting hinge parts 5, the inclined hinge parts 9, the lid piece connecting hinge parts 10, and the belt members 34 are molded from a soft resin such as TPE (elastomer), LDPE (low density polyethylene), or EVA (ethylene-vinyl acetate copolymer).

Figure 16:
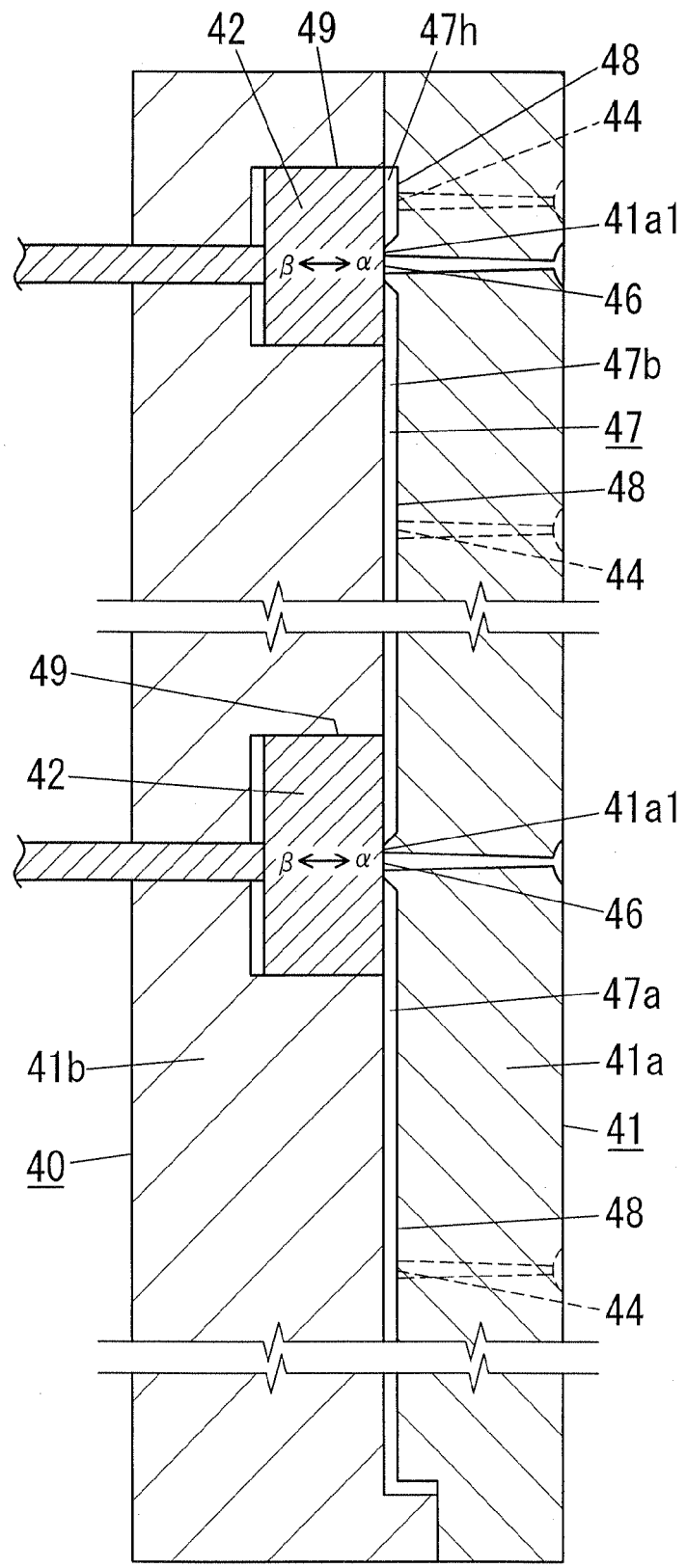
FIG. 16 is a sectional view of an injection molding die device, in a die closed state, for two-color molding of the box half bodies made of synthetic resin shown in FIGS. 12 and 13.

To integrally mold the box half bodies 12 with the two-color injection molding of synthetic resins, the box half bodies 12 are molded in order shown in FIGS. 16 to 19 using, for example, an injection molding die device 40 shown in FIG. 16.

The injection molding die device 40 shown in FIG. 16 includes a slide core 42, which freely advances and retracts, provided in a die part 41, a first gate 44 for injecting hard synthetic resin 43, and a second gate 46 for injecting soft synthetic resin 45.

The die part 41 includes a fixed die part 41a and a movable die part 41b. A concave portion 49 is provided in a surface of the movable die part 41b opposed to the fixed die part 41a. The slide core 42 is internally provided in the concave portion 49, to freely advance and retract (in FIG. 16, an arrow α indicates an advancing direction and an arrow β indicates a retracting direction).

In the present invention, the movable die part 41b is movable in a lateral direction (a horizontal direction) or an up to down direction (a vertical direction) with respect to the fixed die part 41a. The die is closed and opened by moving the movable die part 41b. The slide core 42 is movable in a direction same as the movable direction of the movable die part 41b with respect to the movable die part 41b.

Figure 20:
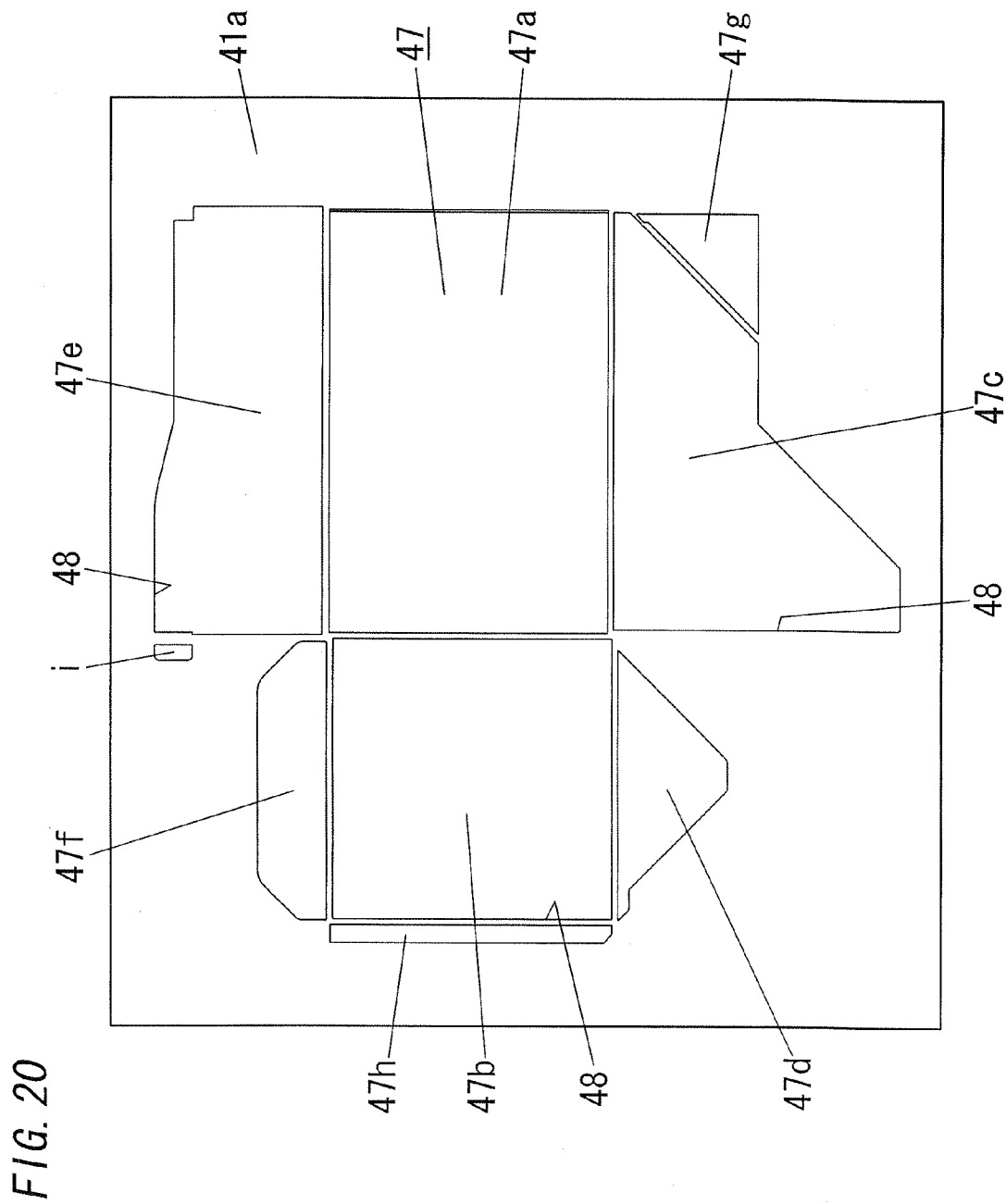
FIG. 20 is an explanatory diagram showing an arrangement relation among a plurality of cavity parts for primary injection molding.

When the fixed die part 41a and the movable die part 41b are closed and the slide core 42 is advanced, a space surrounded by the fixed die part 41a and the movable die part 41b and the advanced slide core 42 is formed as a cavity part for primary injection molding 47. As the cavity part for primary injection molding 47, as shown in FIG. 20, there are two cavities for side panel molding 47a and 47b independent from each other, two cavity parts for bottom piece molding 47c and 47d, two cavity parts for lid piece molding 47e and 47f, one cavity part for overlapping piece molding 47g, one cavity part for connecting part molding 47h, and one cavity part for lock member molding 47i. In these cavity parts for primary injection molding 47, the cavity parts for primary injection molding 47 adjacent to each other are formed to be spaced apart a distance same as width which becomes the hinge part.

As shown in FIG. 16, the slide core 42 is extended between ends of the adjacent cavity parts for primary injection molding 47 formed to be spaced apart the distance. The center of a front surface of the slide core 42 is opposed to a portion 41a1 between ends of the cavity parts for primary injection molding 47 of the fixed die part 41a. Both sides of the front surface of the slide core 42 form inner surfaces of one sides of the ends of the cavity parts for primary injection molding 47, respectively.

The plurality of cavity parts for primary injection molding 47 are formed by providing a plurality of recesses for cavity formation 48 in one or both of opposed surfaces of the fixed die part 41a and the movable die part 41b. In this embodiment, an example in which the plurality of recesses for cavity formation 48 are formed in the fixed die part 41a is described.

When only the slide core 42 is retracted in a state where the fixed die part 41a and the movable die part 41b are closed, the ends of the outer surfaces of the hard synthetic resin molded parts (the side panels 1a and 1b, the bottom pieces 4a and 4b, the lid pieces 15a and 15b, the connecting part 18, and the fastening tool 35) molded in the respective cavity parts for primary injection molding 47 (the cavity parts for side panel molding 47a and 47b, the cavity parts for bottom piece molding 47c and 47d, the cavity parts for lid piece molding 47e and 47f, the cavity part for overlapping piece molding 47g, the cavity part for connecting part molding 47h, and the cavity part for lock member molding 47i), respectively, are exposed and a space, which becomes a cavity part for secondary injection molding 50, surrounded by the exposed surfaces of the respective hard synthetic resin molded parts, the die part 41, and the slide core 42 is formed.

The first gate 44 and the second gate 46 are provided in the fixed die part 41a respectively. At least one first gate 44 is provided for each of the cavity parts for primary injection molding 47. The second gate 46 is provided between the adjacent cavity parts for primary injection molding 47 of the fixed die part 41a respectively. When the die part 41 is closed and the slide core 42 is advanced, a front end face of the slide core 42 comes into contact with the second gate 46 and closed. When the die part 41 is closed and the slide core 42 is retracted to form the cavity part for secondary injection molding 50, the second gate 46 is opened in the cavity part for secondary injection molding 50.

The box half bodies 12 are molded as described below using the injection molding die device 40 described above.

Figure 17:
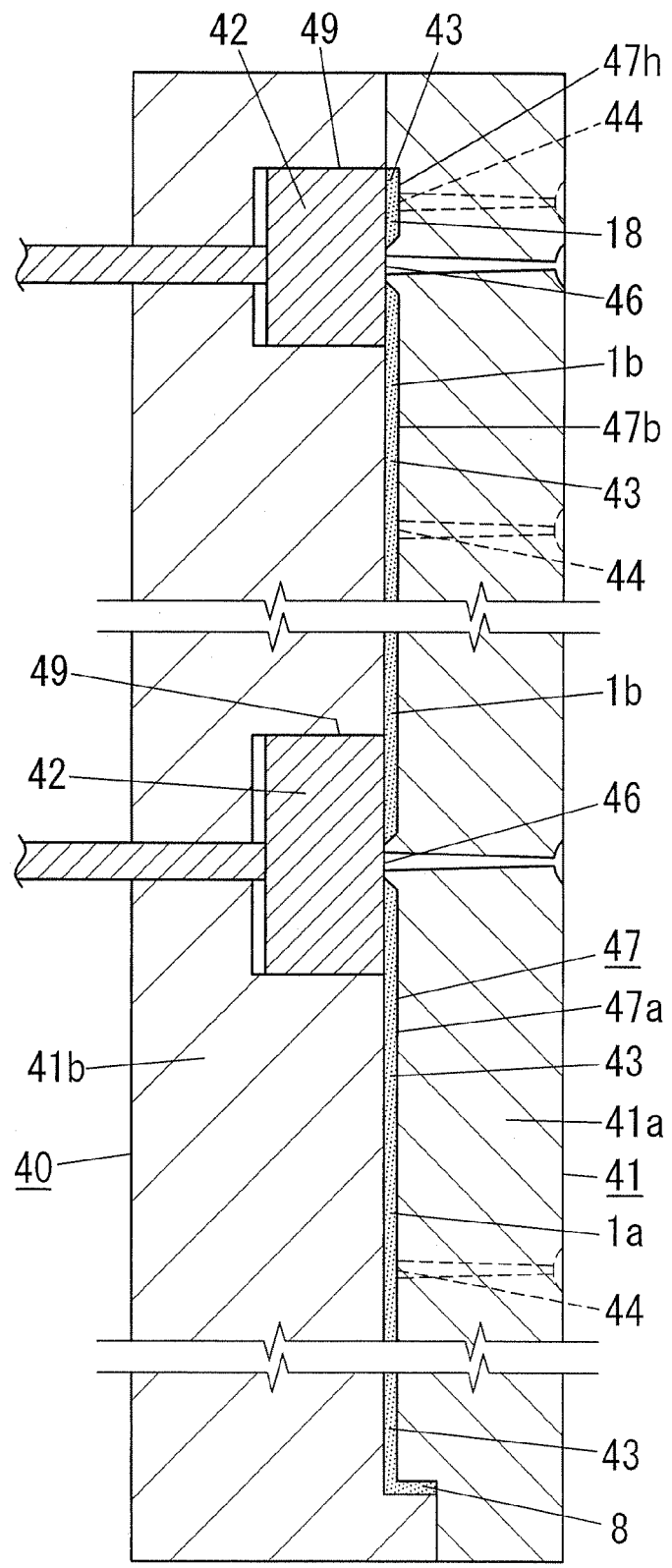
FIG. 17 is a sectional view of the injection molding die device in a state where hard synthetic resin is filled in a cavity part for primary injection molding by primary injection molding and a main body part and a lock member are molded.

First, as shown in FIG. 16, a plurality of die parts 41 are closed and the slide cores 42 are advanced to form a plurality of cavity parts for primary injection molding 47. As shown in FIG. 17, the hard synthetic resin 43 is injected into the plurality of cavity parts for primary injection molding 47 from the first gates 44 by primary injection molding to mold the side panels 1a and 1b, the bottom pieces 4a and 4b, the lid pieces 15a and 15b, the overlapping pieces 11, the connecting parts 18, and the fastening tools 35 (a primary injection step).

Figure 18:
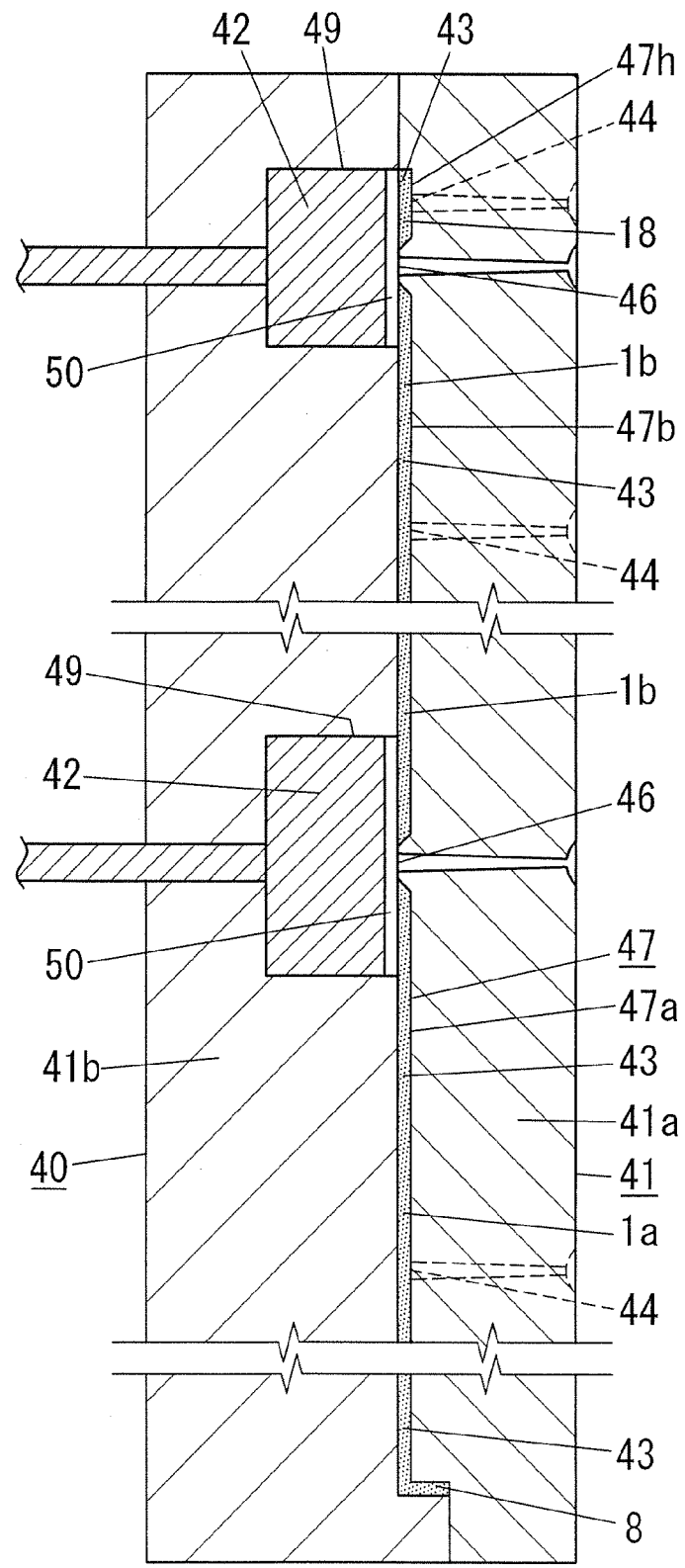
FIG. 18 is a sectional view of the injection molding die device at a stage when a cavity part for secondary injection molding is formed.

Next, as shown in FIG. 18, in a state where the plurality of die parts 41 are kept closed, the slide cores 42 are retracted to expose the ends of the respective outer surfaces of the side panels 1a and 1b, the bottom pieces 4a and 4b, the lid pieces 15a and 15b, the overlapping pieces 11, the connecting parts 18, and the fastening tools 35 and form a plurality of cavity parts for secondary injection molding 50 surrounded by the adjacent exposed surfaces, the retracted slide cores 42, and the die parts 41.

Figure 19:
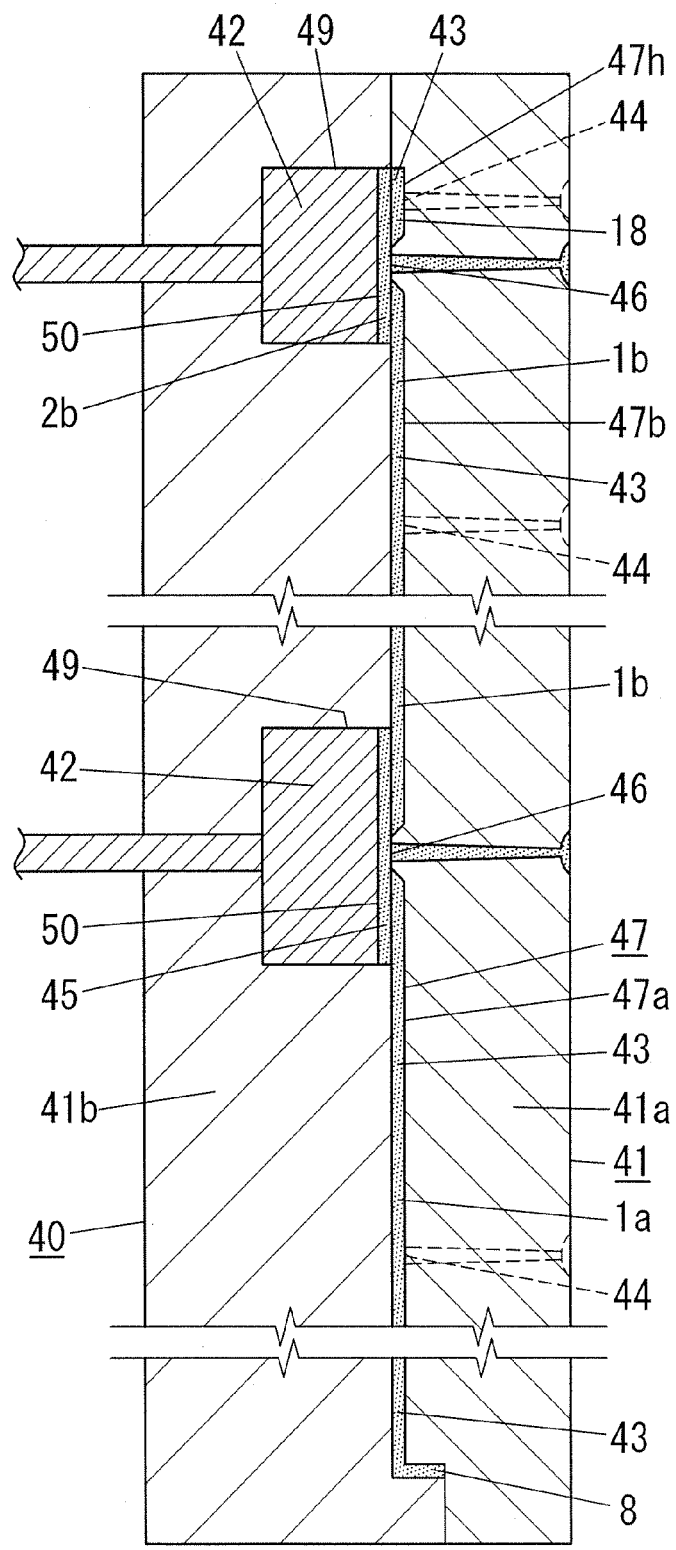
FIG. 19 is a sectional view of the injection molding die device at a stage when soft synthetic resin is filled in the cavity part for secondary injection molding by secondary injection molding and a hinge part and a belt member are molded.

As shown in FIG. 19, the soft synthetic resin 45 is injected into the cavity parts for secondary injection molding 50 formed as described above from the second gates 46 by secondary injection molding to mold the side panel connecting hinge parts 2a and 2b, the bottom piece connecting hinge parts 5, the inclined hinge parts 9, the lid piece connecting hinge parts 10, and the belt members 34. Both the ends of the side panel connecting hinge part 2a are integrated, in overlapping relation, with adjacent one ends of the outer surfaces of the side panels 1a and 1b, respectively, both the ends of the side panel connecting hinge part 2b are integrated, in overlapping relation, with the other end of the outer surface of the side panel 1b and the outer surface of the connecting part 18, respectively, both the ends of each of the bottom piece connecting hinge parts 5 are integrated, in overlapping relation, with the end of the outer surface of the side panel 1 and the end outer surface of the bottom piece 4, respectively, both the ends of the inclined hinge part 9 are integrated, in overlapping relation, with the end of the outer surface of the bottom piece 4 and the end of the outer surface of the overlapping piece 11, respectively, both the ends of each of the lid piece connecting hinge parts 10 are integrated, in overlapping relation, with the end of the outer surface of the side panel 1 and the end of the outer surface of the lid piece 15, respectively, and both the ends of the belt member 34 are integrated, in overlapping relation, with the end of the outer surface of the lid piece 15a and the outer surface of the fastening tool 35 (a secondary injection step).

After the secondary injection molding is executed as described above, the injection molding die device 40 is opened and a release step for extracting the box half bodies 12 shown in FIGS. 12 and 13 is executed.

A series of the steps in the injection molding die device 40 from the closing of the dies to the primary injection step, the secondary injection step, and the release step are executed by control of a control unit (not shown).

As described above, the hard synthetic resin is subjected to the primary injection molding to mold the side panels 1, the bottom pieces 4, the overlapping pieces 11, the lid pieces 15, and the fastening tools 35, then, the soft synthetic resin is subjected to the secondary injection molding in the identical die, and both the ends of the side panel connecting hinge parts 2, the bottom piece connecting hinge parts 5, the inclined hinge parts 9, the lid piece connecting hinge parts 10, and the belt members 34 made of soft synthetic resin are integrated, in overlapping relation, with the outer surfaces of the side panels 1, the bottom pieces 4, the overlapping pieces 11, the lid pieces 15, and the fastening tools 35, respectively. In this way, it is possible to provide both the ends of the side panel connecting hinge parts 2, the bottom piece connecting hinge parts 5, the inclined hinge parts 9, the lid piece connecting hinge parts 10, and the belt members 34 made of soft synthetic resin to be exposed to the outside on the outer surface of the side panels 1, the bottom pieces 4, the overlapping pieces 11, the lid pieces 15, and the fastening tools 35, respectively. Consequently, in this folding box A, in a state where the folding box A is assembled into the box form, i.e., a state where a hexahedron box is formed, in the outer surfaces of the side panels 1, the bottom pieces 4, and the lid pieces 15 forming the respective surfaces of the hexahedron, the overlapping and integrated parts of the ends of the side panel connecting hinge parts 2, the bottom piece connecting hinge parts 5, and the lid piece connecting hinge part 10 made of soft synthetic resin are exposed near the four edges of the side panels 1, near the edges on the sides of the bottom pieces 4 adjacent to the side panels 1, and near the edges on the sides of the lid pieces 15 adjacent to the side panels 1, respectively. Therefore, the overlapping and integrated parts can be used as the nonslip parts 13 of the soft synthetic resin parts as well. By forming the nonslip parts 13 in a strip shape, it is possible to form the nonslip parts 13 in a size which allows the worker to surely make surface contact therewith when the worker touches the nonslip parts 13 with the hands and the fingers.

Using the two box half bodies 12 integrally molded by the two-color molding for injecting the hard synthetic resin and the soft synthetic resin in the identical die as described above, the connecting part 18 provided at the side end of the other side panel 1b of the one box half body 12 is laid over and connected to the overlapping margin absorbing projection 8 provided at the side end of one side panel 1a of the other box half body 12 by the connecting means 16. In the same manner, the connecting part 18 of one box half body 12 is laid over and connected to the overlapping margin absorbing projection 8 of the other box half body 12. Consequently, the two side panel connecting hinge parts 2a are located at one pair of diagonal corners and the other two side panel connecting hinge parts 2b are located at the other pair of diagonal corners, and the rectangular-tube shaped side wall configuration member 3 which becomes a rectangular or square shape in a plan view in an assembled state and, in folding, which can be folded into an approximate parallelogram form in such a way that the side panel connecting hinge parts 2b become an acute angle and the side panel connecting hinge parts 2a become an obtuse angle is formed.

And, the overlapping piece 11 of one box half body 12 and the bottom piece 4b of the other box half body 12 are laid one on top of the other and slidably connected in an overlapping state by the slide coupling means 17. In the same manner, the overlapping piece 11 of the other box half body 12 and the bottom piece 4b of one box half body 12 are laid one on top of the other and slidably connected in the overlapping state by the slide coupling means 17. That is, when the folding box A is formed by connecting the two box half bodies 12 as described above, both the adjacent bottom pieces 4a and 4b are slidably connected through the inclined hinge parts 9 and the overlapping pieces 11 at the corner of one pair of diagonal corners folded into an approximate parallelogram form in such a way that the corner becomes an acute angle. The bottom pieces 4 integrally molded during molding of the respective box half bodies 12 are not connected to each other and are in a relation free from each other. In other words, when the two box half bodies 12 are coupled as described above to form the folding box A, both the bottom pieces 4 adjacent at the corner of one pair of diagonal corners folded into an approximate parallelogram form in such a way that the corner becomes an obtuse angle are not connected. In this way, the bottom plate configuration member 6 which is foldable in such a way that the four bottom pieces 4 overlap the inner surfaces of the respective side panels 1 through the bottom piece connecting hinge parts 5 is formed.

As described above, it is possible to form the folding box A made of synthetic resin by combining and coupling the two box half bodies 12. It is noted that, in this embodiment, since box half bodies having the identical shape are used as the two box half bodies 12 to be combined, it is possible to mold the box half bodies 12 with a common molding die. It goes without saying that, in the present invention, the two box half bodies 12 for combining and forming the folding box A made of synthetic resin do not have to be box half bodies having the identical shape. The folding box A made of synthetic resin may be formed by combining and coupling the two box half bodies 12 having different shaped molded by different molding dies.

The connecting parts 18 may be made of soft synthetic resin in the same manner as the side panel connecting hinge parts 2b made of soft synthetic resin. Alternatively, the connecting parts 18 made of hard synthetic resin may be provided at the distal ends of the side panel connecting hinge parts 2b made of soft synthetic resin (in this embodiment, the connecting parts 18 made of hard synthetic resin are provided and are integrated, in overlapping relation, with the inner surfaces or outer surfaces of the soft parts of the distal ends of the side panel connecting hinge parts 2b made of soft synthetic resin).

The connecting means 16 is not specifically limited. For example, bonding, welding, or connection by engagement, or connection by a fixing tool may be used. In the case of the connection by engagement, for example, as shown in FIGS. 12 and 13, it is also possible that engaging parts 16a are provided in the overlapping margin absorbing projections 8, and engaged parts 16b are provided on the side panel connecting hinge parts 2b (the connecting parts 18) side, and the engaging parts 16a are engaged with the engaged parts 16b.

Slide coupling means 17 for slidably coupling the overlapping piece 11 and the bottom piece 4b in an overlapping state is configured by, for example, as shown in FIGS. 10A and 10B, protrudingly providing a slide protrusion 19 in one of the overlapping piece 11 or the bottom piece 4b, forming a slide hole 20 larger than the slide protrusion 19, in which the slide protrusion 19 is slidably inserted, in the other of the overlapping piece 11 or the bottom piece 4b, and providing a slip-off preventing part 20a for preventing the slide protrusion 19 from coming off the slide hole 20 in the slide hole 20.

In the folding box A having the structure described above, when the rectangular-tube shaped side wall configuration member 3 is assembled to be a rectangular or square shape in a plan view, while keeping a state where the overlapping pieces 11 and the bottom pieces 4b are slidably coupled in overlapping relation, the four bottom pieces 4a and 4b become a right angle with respect to the respective side panels 1 to form a square tube shaped bottom, and a box opened upward is assembled.

Various contents are stored in the folding box A in a state where the folding box A is assembled into the box form in this way and, then, the lid pieces 15 are laid to close the upper opening of the folding box A as shown in FIG. 2. At this point, in the corner of the folding box A, base parts of the ends of the upper lid piece 15a are placed on supporting parts of the upper surfaces of the corner connecting parts 30 which integrally connect the corner parts formed by the upper ends of the overlapping margin absorbing projections 8 and the upper ends of the side panels 1a.

Thereafter, the fastening tools 35 are locked to the fastened parts 36. Since the belt members 34 are molded with the soft synthetic resin, the belt members 34 have flexibility and some degree of elasticity (stretchability). Therefore, it is possible to easily lock the fastening tool 35 provided on the lid piece 15 side to the fastened part 36 provided on the side panel 1b side by locking the fastening tool 35 to the fastened part 36 in a state where the belt member 34 is bent and stretched downward. Moreover, since the belt member 34 is fastened in a state where the belt member 34 is stretched using elasticity thereof, a locked state is surely maintained. In releasing the lock, the belt member 34 is further stretched by holding the fastening tool 35 with the fingers and pulled further downward, and the fastening tool 35 is released from the fastened part 36, whereby it is possible to release the lock.

Figure 14:
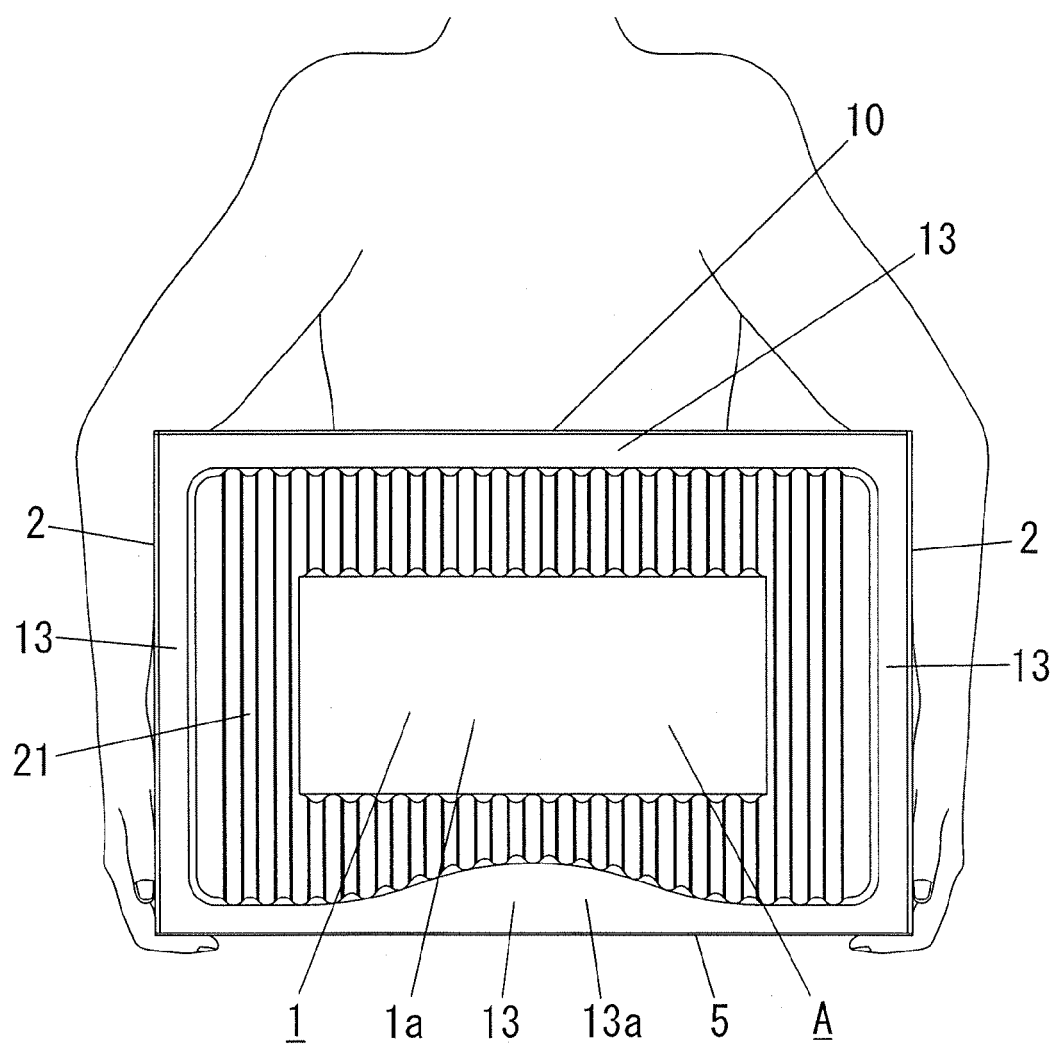
FIG. 14 is a front view showing an example in which the folding box is carried by hands.

The folding box A assembled into the box form as above and having contents therein is gripped by the hands and carried in a state where the upper opening is closed by the lid pieces 15. When the worker carries the folding box A with the hands in a state where the folding box A is assembled into the box form, usually, as shown in FIG. 14, the worker carries the folding box A by gripping an opposed pair of edges at the bottom ends with both the hands to hold the entire folding box A, in the same manner as the folding box made of cardboard. In this case, since the nonslip parts 13 made of soft synthetic resin are provided near the edges, both the hands can grip the nonslip parts 13 parts made of soft synthetic resin near the edges. Thus, the worker can surely and stably carry the folding box A without a slip of the hands. When the worker grips the opposed pair of edges at the bottom ends with both the hands in this way, the worker usually grips substantially the centers in the longitudinal directions. Since the parts corresponding to the middle parts in the longitudinal directions of the respective edges of the bottom ends are the wide nonslip parts 13a which are wider than other parts, the worker can more surely grip the folding box A with the hands by gripping the wide nonslip parts 13a. Moreover, when the worker grips the bottom ends of whichever pair of side panels 1 of the opposed two pairs of side panels 1, the worker can grip the wide nonslip parts 13a with the hands.

When the worker carries the folding box A with both the hands in a normal way of carrying shown in FIG. 14, since the arms of the worker who carries the folding box A touch the part of the nonslip parts 13 provided near the left and right edges of the upper ends, the folding box A is also prevented from slipping by those parts. Moreover, the nonslip parts 13 provided near the respective upper and lower edges of the folding box A opposed to the belly of the worker touch the belly of the worker, whereby the folding box A is also prevented from slipping, and the worker can stably carry the folding box A.

Furthermore, whichever surface of the six surfaces of the folding box A is a lower surface (i.e., even when the folding box A takes various postures, for example, the front and rear or the left and right of the folding box A are reversed or the upper part and lower part of the folding box A are reversed), when the worker carries the folding box A by gripping with both the hands the opposed pair of edges of the bottom ends to hold the entire folding box A as described above, in the present invention, since the nonslip parts 13 made of soft synthetic resin are provided in every neighborhood of the edges of the hexahedron, the folding box A does not slip and the worker can surely and stably carry the folding box A in the same manner as described above.

In the present invention, in a state where the folding box A is assembled into the box form, as shown in FIGS. 1 and 2, the nonslip parts 13 made of soft synthetic resin are also provided to be exposed to the outside on the outer surfaces of three surfaces forming the corner part of the hexahedron near the corner part. To provide the nonslip parts 13 in the corner parts, the nonslip parts 13 only have to be formed over the entire lengths of the end edges of the side panels 1, the bottom pieces 4, and the lid pieces 15 along the respective edges of the hexahedron and extended to the corner parts of the hexahedron. In this embodiment, the nonslip parts 13 are provided to be exposed to the outside at all corners of the three surfaces forming the corner parts of the hexahedron. However, the nonslip parts 13 may be provided at corners of one or two surfaces among the three surfaces forming the corner parts.

In the case where the nonslip parts 13 are provided in the corner parts of this hexahedron, the nonslip parts 13 along the adjacent ends of the side panels 1 are integrally continued to each other through the nonslip parts 13 provided on the outer surfaces of the corners of the side panels 1 as described above to form the nonslip part 13 having a square shape over the entire lengths of the four edges of the outer surface of each side panel 1. In this case, the nonslip parts 13 provided on the outer surfaces along the respective edges of each side panel 1 can be configured to continue in the square shape integrally with one another to prevent the nonslip parts 13 from peeling off.

Figure 15:
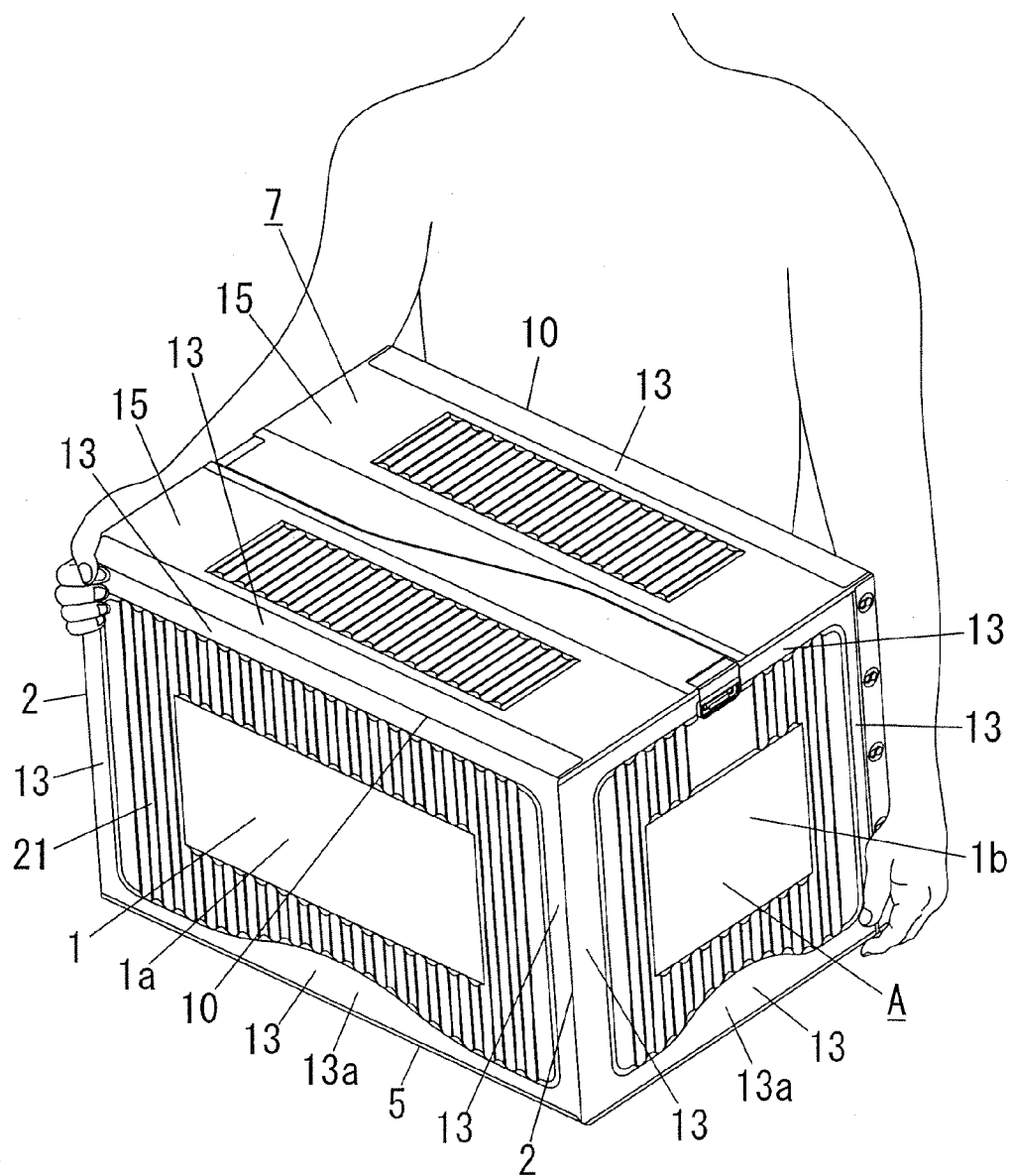
FIG. 15 is a perspective view showing another example in which the folding box is carried by hands.

When the nonslip parts 13 continuing in the square shape are formed around the outer surfaces of the respective side panels 1 as this embodiment, since corners of the square shape are located at the corner parts of the hexahedron, it is possible to surely provide the nonslip parts 13 at the corner parts of the hexahedron. Consequently, as shown in FIG. 15, it is possible to surely prevent the hands from slipping even when the worker carries the folding box A by gripping the corner parts of the hexahedron with the hands.

As described above, not only when the worker carries this folding box A by gripping the opposed pair of edges of the bottom ends with the hand to hold the entire folding box A, but also when the worker carries the folding box A by gripping different arbitrary edges among the twelve edges of the hexahedron with the hands or when the worker carries the folding box A by gripping the corner parts of the hexahedron with the hands, since the worker grips the nonslip parts 13 with the hands whichever parts of the folding box A the worker holds, the folding box A does not slip and it is easy to carry the folding box A.

In transporting or storing the folding boxes A in a state where the folding boxes A are assembled into the box form, the folding boxes A are vertically stacked in multiple stages. Here, by providing the nonslip parts 13 made of soft synthetic resin near the ends on the side panels 1 side of the outer surfaces of the bottom pieces 4 and the lid pieces 15 as described above, even if the folding boxes A are vertically stacked in multiple stages, it is possible to prevent the folding box A on the upper stage from slipping with respect to the folding box A on the lower stage to collapse. When the folding boxes A are directly placed on a pallet or a conveyor, the folding boxes A are also prevented from slipping. Moreover, when the folding boxes A are put in a chilling room, even if surfaces of a floor, a pallet, and the like of the chilling room are frozen, the folding boxes A hardly slip. When the folding boxes A are put in the chilling room, since the nonslip parts 13 provided on the outer surfaces are made of the soft synthetic resin, the folding boxes A hardly harden even under low temperature and keep softness. Therefore, there is a breakage buffer effect for the corners of the folding boxes A.

When the folding boxes A with the upper openings thereof closed by the lid pieces 15 are vertically stacked in multiple stages in a state where the folding boxes A are assembled into the box form and contents are stored therein, loads intensively act on the corner parts of the folding box A of the lower stage from the upper stag, and the loads are transmitted downward via the corner parts. As described above, since the corner parts formed by the upper ends of the overlapping margin absorbing projections 8 and the upper ends of the side panels 1 on which the overlapping margin absorbing projections 8 are projectedly provided are integrally connected by the corner connecting parts 30 and the upper surfaces of the corner connecting parts 30 are formed as the supporting parts on which a part of the lid pieces 15 is placed and supported when the folding box A is assembled into the box form and the lid pieces 15 are closed, the lid pieces 15 are surely supported by the corner parts and do not bend downward as they sink downward. Consequently, even if the folding boxes A are vertically stacked in multiple stages, the folding boxes A do no collapse and can be stably stacked.

Figure 7:
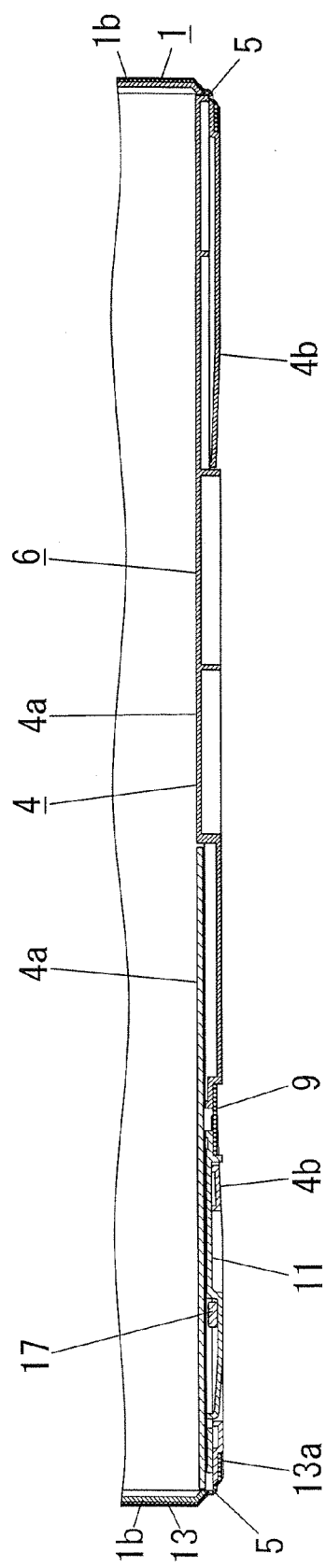
FIG. 7 is a sectional view of the folding box taken along a line Y-Y in FIG. 3.

On the other hand, when no content is stored in the folding box A and the folding box A is not in use, as shown in FIGS. 1, 2, 3, and 4, the folding box A is folded in such a way that the rectangular-tube shaped side wall configuration member 3 formed by the four side panels 1 becomes an approximate parallelogram form as shown in FIG. 9, from the assembled state where the rectangular-tube shaped side wall configuration member 3 formed by the four side panels 1 is a rectangular or square shape in a plan view. Consequently, it is possible to fold the folding box A into a state where the opposed side panels 1 are substantially parallel and the bottom pieces 4 are laid one on top of another along the inner surfaces of the side panels 1 as shown in FIGS. 7, 8A, and 8B, i.e., a flat state. In this case, it is possible to naturally fold the folding box A by absorbing, by the overlapping margin absorbing projections 8, overlapping margins of the side panels 1 opposed to each other in the folded state and the bottom pieces 4 laid on top of another along the inner surfaces of the respective side panels 1.

Figure 11:
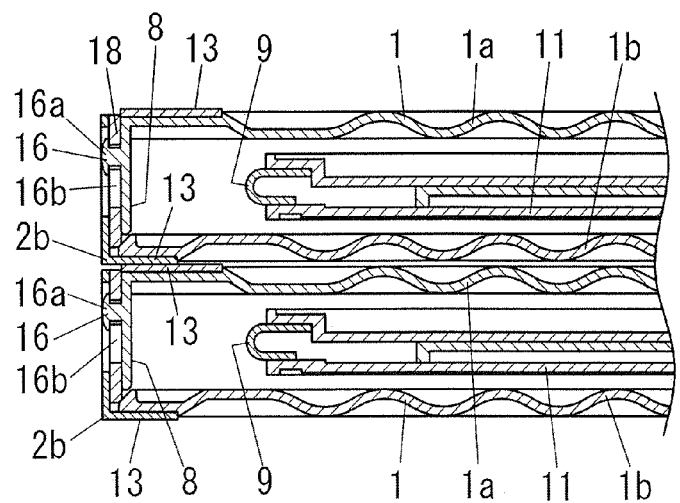
FIG. 11 is a partially omitted enlarged sectional view showing the folding boxes which are vertically stacked in multiple stages in a state where the folding boxes are folded flatly.

When the folding boxes A are folded flatly in this way and vertically stacked in multiple stages as shown in FIG. 11, since the nonslip parts 13 made of soft synthetic resin are provided on the outer surfaces of the side panels 1, the upper and lower folding boxes A folded flatly are laid one on top of another in this part. Thus, even if the side panel 1 made of hard synthetic resin is directly laid on the side panel 1 made of hard synthetic resin, the folding boxes A less easily slip down. Since the folding boxes A are prevented from slipping by being brought into vertical contact with each other in the nonslip parts 13 parts made of soft synthetic resin, even if the folding box A at the upper stage is not accurately stacked but stacked to be shifted with respect to the folding box A at the lower stage or the folding boxes A are stacked in different directions, as long as the folding boxes A are in contact with the nonslip parts 13, the folding boxes A can be surely prevented from slipping and can be stably stacked.

As shown in FIG. 5, since the folding box A made of synthetic resin of this invention is folded in such a way that the rectangular-tube shaped side wall configuration member 3 formed by the four side panels 1 becomes an approximate parallelogram form, the inner surfaces of the side panels 1 are not exposed when the folding box A is not in use. Since the bottom pieces 4 are folded along the inner surfaces of the side panels 1 and interposed between the side panels 1, the bottom pieces 4 are not exposed to the outside. Further, since the lid pieces 15 overlap each other in such a way that the inner surfaces of the lid pieces 15 are opposed to each other, exposed parts of the inner surfaces are small. Therefore, it is possible to prevent the inner surfaces of the folding box A in the folded state from being exposed to the outside and soiled or, when a large number of the folding boxes A are vertically stacked, and prevent the outer surfaces of the other folding boxes A from coming into contact with the inner surfaces of the folding box A to soil the inner surfaces. Since the inner surface parts in which contents are stored are not soiled, this is advantageous in repeatedly using the folding box A.

In the present invention, since the folding box A is made of the synthetic resin, the folding box A is high in strength, highly durable, and hardly soiled and can be cleaned. Therefore, the folding box A can be reused many times and is economical and it is possible to realize resource saving.

In the present invention, the overlapping pieces 11 are projected through the inclined hinge parts 9 on one sides of the bottom pieces 4a continuously led out from one side panel 1a and are slidably connected, in an overlapping state, to the bottom pieces 4b continuously led out from the bottom ends of the adjacent other side panel 1b through the bottom piece connecting hinge parts 5. Thus, when the rectangular-tube shaped side wall configuration member 3 is formed to be a rectangular or square shape in a plan view or is folded into an approximate parallelogram form, the overlapping pieces 11 slide with respect to the bottom pieces 4b while keeping the overlapping state. Therefore, the bottom pieces 4a rotate with respect to the side panels 1a through the bottom piece connecting hinge parts 5, the overlapping piece 11 rotate with respect to the side panels 1a through the inclined hinge parts 9, and, at the same time, the bottom pieces 4b rotate with respect to the side panels 1b through the bottom piece connecting hinge parts 5 while sliding with respect to the overlapping pieces 11 in the overlapping state. Consequently, simply by forming the rectangular-tube shaped side wall configuration member 3 to be a rectangular or square shape in a plan view, it is possible to automatically and smoothly form, while automatically rotating the four bottom pieces 4, the bottom of the box by the bottom plate configuration member 6 formed by the four bottom pieces 4. By folding the rectangular-tube shaped side wall configuration member 3 to be an approximate parallelogram form, it is possible to automatically and smoothly fold the respective bottom pieces 4 to extend along the inner surfaces of the respective side panels 1.

In the folding box A made of synthetic resin of the present invention, a part or all of the side panel connecting hinge parts 2, the bottom piece connecting hinge parts 5, the inclined hinge parts 9, and the lid piece connecting hinge parts 10 are molded from the soft synthetic resin. Therefore, when the folding boxes A are stacked in a state where the folding boxes A are assembled into the box form, when the folding boxes A are stacked in a state where the folding boxes A are folded into an approximate parallelogram form, when the folding boxes A are conveyed on a conveyor, or when the folding boxes A are placed on placing parts of a floor, a conveyor, a load-carrying platform of a truck, the other folding boxes A made of synthetic resin, or the like, in a state where the folding boxes A are assembled into a box form, the hinge parts made of the soft synthetic resin come into contact with the placing parts. Consequently, the hinge parts perform a nonslip function and it is possible to prevent the folding boxes A from slipping or shifting. When an impact is applied to the folding box A, the hinge parts made of a soft resin perform a buffer action against the impact. In this case, if the outer surfaces of the hinge parts made of soft synthetic resin are further projected to the outside slightly than the outer surfaces of the side panels 1, the bottom pieces 4, the overlapping pieces 11, and the lid pieces 15, the nonslip effect can be further performed.

In the present invention, when a transparent or translucent resin is used as the hard synthetic resin for molding the side panels 1, the bottom pieces 4, and the lid pieces 15, it is possible to visually recognize presence or absence and a volume of contents in the folding box A from the outside. In this case, it is preferable to make at least one pair of side panels 1 transparent or translucent. It goes without saying that all the side panels 1 may be molded from the transparent or translucent hard synthetic resin. Moreover, in addition to the side panels 1, the bottom pieces 4 and the lid pieces 15 may be molded by the transparent or translucent hard synthetic resin. When the side panels 1, the bottom pieces 4, and the lid pieces 15 are made transparent or translucent, the side panels 1, the bottom pieces 4, and the lid pieces 15 may be colored-transparent or colored-translucent.

When soft synthetic resin having a color different from that of the hard synthetic resin is used as the soft synthetic resin for molding the nonslip parts 13 and the hinge parts, parts of the hard synthetic resin and parts of the soft synthetic resin are distinguished by the colors, and an external appearance of the folding box A is improved. In this case, when soft synthetic resin having a bright color, which can be easily seen even in a dark place, is used as the soft synthetic resin, since edge positions of the hexahedron are easily found in the dark place, the worker can visually recognize an outline of the hexahedron, can carry the folding box A by surely gripping the edge parts of the hexahedron with the hands, and, even when the user moves in the dark place, can visually recognize the outline of the hexahedron. Therefore, it is possible to prevent the worker from strike the folding box A against other objects.

In the embodiment shown in the attached drawings, corrugated vertical ribs 21 are provided while leaving flat surface parts for integrating, in overlapping relation, at least the nonslip parts 13 (the side ends of the hinge parts) made of soft synthetic resin on the outer peripheries of the side panels 1. By the corrugated vertical ribs 12, the side panels 1 are prevented from being deformed by a load from an upper direction, and the folding box A is prevented from being damaged when other objects bump into the folding box A. However, the ribs are not limited to the corrugated vertical ribs 21 shown in the drawings and may be ribs of any other shapes as long as the ribs are vertical ribs. Ribs may be provided not only in the side panels 1 but also in the bottom pieces 4 and the lid pieces 15.

In this embodiment, the example of the folding box A made of synthetic resin of a so-called bottom lock type in which the respective bottom pieces 4 are folded to overlap the inner surfaces of the respective side panels 1 in a state where the folding box A is folded flatly is explained. However, the folding box A made of synthetic resin may be a folding box of a type in which the bottom pieces 4 are spread to continue to be flush with the side panels 1 when the folding box is folded flatly.

The invention claimed is:

1. A folding box made of a synthetic resin which turns into a hexahedral box when it is assembled into a box form, said folding box comprising:
a rectangular-tube shaped side wall configuration member which becomes a rectangular or square shape in a plan view in a state where the folding box is assembled into a box form, said rectangular-tube shaped side wall configuration member being comprised of four side panels made of hard synthetic resin for constructing front/rear/left/right side surfaces, and adjacent side ends of said four side panels being foldably connected to each other through side panel connecting hinge parts, said rectangular-tube shaped side wall configuration member being configured to be able to be folded flatly by folding said side panels into an approximate parallelogram form in such a way that each corner of one pair of diagonal corners becomes an acute angle and each corner of the other pair of diagonal corners becomes an obtuse angle;
a bottom plate configuration member which is to be a bottom of the folding box when the folding box is assembled into the box form, said bottom plate configuration member being comprised of connecting bottom pieces made of hard synthetic resin which are foldably connected to bottom ends of the plurality of side panels through bottom piece connecting hinge parts,
a lid configuration member which is to be a lid of an upper surface of the folding box when the folding box is assembled into the box form, said lid configuration member being comprised of lid pieces made of hard synthetic resin which are foldably connected to upper ends of the plurality of side panels through lid piece connecting hinge parts,
wherein
said side panel connecting hinge part, said bottom piece connecting hinge part, and said lid piece connecting hinge part are made of soft synthetic resin,
both ends of each hinge part being integrated, in overlapping relation, with outer surfaces of said side panel, said bottom piece, or said lid piece, which are made of the hard synthetic resin, by using two-color molding of synthetic resins so that they are flush with the outer surfaces or they jut out from the outer surfaces, said soft synthetic resin of each hinge part which is integrated, in overlapping relation, with the outer surfaces of said side panel, said bottom piece, or said lid piece which are made of the hard synthetic resin being exposed to the outside in neighborhood of an edge of the hexahedral box on either or both of the surfaces of the hexahedral box which are adjacent to each other at right angles through the edge of the hexahedral box when the folding box is assembled into the hexahedral box so as to form a nonslip part, said nonslip parts being formed in neighborhood of every edge of the hexahedral box.

2. The folding box as set forth in claim 1, wherein each of said nonslip parts made of the soft synthetic resin has a strip shape and it is formed over an entire length or approximate entire length of the edge.

3. The folding box as set forth in claim 2, wherein a part corresponding to a middle part of the edge in a length direction of the edge of said nonslip part made of the soft synthetic resin and provided over the entire length or approximate entire length of the edge is wider than other parts of the nonslip part.

4. The folding box as set forth in claim 1, wherein said nonslip parts made of the soft synthetic resin and exposed to the outside are formed on outer surfaces at corner parts of said hexahedral box.

5. The folding box as set forth in claim 1, wherein said nonslip parts are formed in neighborhoods of the four edges of the respective outer surfaces of said four side panels.

6. The folding box as set forth in claim 5, wherein said nonslip parts made of the soft synthetic resin and exposed to the outside are formed over the entire length of the four edges of the outer surface of each side panel and said nonslip parts made of soft synthetic resin are also formed at corner parts of the outer surface of each side panel, said nonslip parts along adjacent edges being integrally continued to each other through said nonslip parts formed at the corner parts to form the nonslip parts having a square shape over the entire length of an outer periphery of the outer surface of each side panel.

7. The folding box as set forth in claim 6, wherein said folding box is assembled by coupling two box half bodies, each of said box half bodies being integrally molded by the two-color molding of the hard synthetic resin and the soft synthetic resin, and each of said box half bodies comprising two side panels made of the hard synthetic resin which are integrally continued to each other at respective one side ends through the side panel connecting hinge part made of the soft synthetic resin, the bottom piece(s) integrally continued to the bottom end(s) of said one or two side panels through the bottom piece connecting hinge part(s) made of the soft synthetic resin, and the lid piece(s) integrally continued to the upper end(s) of said one or two side panels through the lid piece connecting hinge part(s) made of the soft synthetic resin, said rectangular-tube shaped side wall configuration member having four side panels being configured by foldably connecting the other side ends of the two side panels of one box half body to the other side ends of the two side panels of the other box half body, said bottom plate configuration member being configured by said bottom pieces of said two box half bodies, said lid configuration member being configured by said lid pieces of said two box half bodies.

\* \* \* \* \*